United States Patent
Wong

(10) Patent No.: US 11,477,427 B2
(45) Date of Patent: Oct. 18, 2022

(54) 3D LIGHT FIELD DISPLAYS UTILIZING MICRO-LED PIXEL ARRAYS AND METASURFACE MULTI-LENS ARRAYS

(71) Applicant: Herman Wong, Markham (CA)

(72) Inventor: Herman Wong, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/159,807

(22) Filed: Jan. 27, 2021

(65) Prior Publication Data

US 2022/0239883 A1 Jul. 28, 2022

(51) Int. Cl.
*H04N 13/111* (2018.01)
*H04N 13/167* (2018.01)
*H04N 13/133* (2018.01)
*H04N 13/125* (2018.01)

(52) U.S. Cl.
CPC ......... *H04N 13/111* (2018.05); *H04N 13/125* (2018.05); *H04N 13/133* (2018.05); *H04N 13/167* (2018.05)

(58) Field of Classification Search
USPC .......................................................... 348/47
See application file for complete search history.

(56) References Cited

U.S. PATENT DOCUMENTS

| 5,796,522 | A | 8/1998 | Meyers |
| 9,681,043 | B2 | 6/2017 | Chen et al. |
| 2008/0204663 | A1* | 8/2008 | Balogh ............... H04N 13/327 353/10 |
| 2013/0313517 | A1 | 11/2013 | Choi |
| 2014/0022619 | A1* | 1/2014 | Woodgate .............. G02B 30/28 359/240 |
| 2014/0146201 | A1* | 5/2014 | Knight ............... H04N 9/04557 348/222.1 |

(Continued)

FOREIGN PATENT DOCUMENTS

| CN | 104427325 | B | * | 4/2018 | ............ G02B 27/22 |
| CN | 110515215 | A | | 11/2019 | |

(Continued)

OTHER PUBLICATIONS

M. Yamaguchi, "Light-field and holographic three-dimensional displays [Invited]," JOSA A 33, No. 12, 2348-2364; 2016.

(Continued)

*Primary Examiner* — Behrooz M Senfi

(57) ABSTRACT

A three-dimensional (3D) light field display module is provided. The display module includes: a 3D pixel array of 3D pixels each made of a plurality of pixels, a metasurface multi-lens array (MLA) made of a plurality of metalenses, and an active matrix electrically coupled to the 3D pixel array for activating each of the plurality of pixels. The metasurface MLA is positioned parallel to the 3D pixel array, spaced therefrom and arranged such that each metalens of the plurality of metalenses is opposite and aligned with a corresponding 3D pixel of the plurality of 3D pixels for directing incident light rays emitted by the 3D pixel to different views. The 3D light field display module may be made with different parameters and can be used in large 3D TV or smartphones with 3D displays.

20 Claims, 20 Drawing Sheets

(56) References Cited

U.S. PATENT DOCUMENTS

| | | | | |
|---|---|---|---|---|
| 2015/0279056 | A1* | 10/2015 | Akeley | G06T 11/001 345/589 |
| 2017/0146806 | A1 | 5/2017 | Lin et al. | |
| 2018/0097033 | A1* | 4/2018 | Ahmed | H01L 27/156 |
| 2019/0149808 | A1* | 5/2019 | Ng | H04N 13/327 348/59 |
| 2019/0197928 | A1* | 6/2019 | Schubert | H04N 13/322 |
| 2019/0204610 | A1* | 7/2019 | Sinkular | H01L 27/14645 |
| 2021/0112647 | A1* | 4/2021 | Coleman | G01S 17/89 |
| 2021/0405277 | A1* | 12/2021 | Brick | H01L 25/0753 |

FOREIGN PATENT DOCUMENTS

| | | |
|---|---|---|
| CN | 212302101 A | 1/2021 |
| WO | 2019204667 A1 | 10/2019 |

OTHER PUBLICATIONS

D. Nam et al., "Flat Panel Light-Field 3-D Display: Concept, Design, Rendering, and Calibration," Proc. IEEE 105, No. 5, 876-891; 2017.
B. Yang et al., "Fabrication of hexagonal compound eye microlens array using DMD-based lithography with does modulation," Opt. Express 26, No. 22, 28927-28937; 2018.
S. Lopera Aristizabal et al., "Microlens array fabricated by a low-cost grayscale lithography maskless system," Opt. Eng. 52, No. 12, 125101; 2013.
Ph. Nussbaum et al., "Design, fabrication and testing of microlens arrays for sensors and microsystems," Pure Appl. Opt. 6, 617-636; 1997.
W. Yan et al., "Integration and Application of Microlens Arrays Within Heads-Up Displays," IEEE Photon. J. 10, No. 6, 6601910; 2018.
G. Lazarev et al. "Ultrahigh-resolution phase-only LCOS spatial light modulator," Proc. SPIE 10125, Emerging Liquid Crystal Technologies XII, 101250M; 2017.
S. Zhao et al., "Molecular Beam Epitaxy of III-Nitride Nanowires," IEEE Nanotechnol. Mag., 6-16; 2019.
W. T. Chen et al., "Broadband Achromatic metasurface-refractive optics," Nano Lett. 18, No. 12, 7801-7808; 2018.
A. Arbabi et al., "Miniature optical planar camera based on a wide-angle metasurface doublet corrected for monochromatic aberrations," Nat. Commun. 7, 13682; 2016.
J. Zhang et al., "Flat dielectric metasurface lens array for three dimensional integral imaging," Opt. Commun. 41, No. 4, 1-4; 2018.
Y.-H. Ra et al., "Full-color single nanowire pixels for projection displays," Nano Lett. 16, 4608-4615; 2016.
R. Wang et al., "Tunable, Full-Color Nanowire Light Emitting Diode Arrays Monolithically Integrated on Si and Sapphire," Proc. SPIE 9748, 9748-S; 2016.
H. Q. T. Bui et al., "Full-Color InGaN/AlGaN Nanowire Micro Light-Emitting Diodes Grown by Molecular Beam Epitaxy A Promising Candidate for Next Generation Micro Displays," Micromachines 10, No. 492; 2019.
M. Cooke, "Hopes for mini-/micro-LED display market space invasion," Semiconductor Today Compounds & Advanced Silicon 12, No. 9, 60-63; 2017.
J. H. Choi et al., "The new route for realization of 1-μm-pixel-pitch high-resolution displays," J. Soc. Inf. Display 27, 487-496; 2019.
B. Liu et al., "Two-Dimensional Optical Metasurfaces: From Plasmons to Dielectrics," Adv. Cond. Matter Phys. 2019, 2329168; 2019.
D. Neshev et al., "Optical metasurfaces: new generation building blocks for multi-functional optics," Light Sci. Appl. 7, No. 58; 2018.
M. Khorasaninejad et al., "Metalenses at visible wavelengths: Diffraction-limited focusing and subwavelength resolution imaging," Science 352, No. 6290, 1190-1194; 2016.
W. T. Chen et al., "A broadband achromatic polarization-insensitive metalens consisting of anisotropic nanostructures," Nat. Comm. 10, 355; 2019.
Z.-B. Fan et al., "A broadband achromatic metalens array for integral imaging in the visible," Light Sci. Appl. 8, 67; 2019.
A. She et al., "Large area metalenses: design, characterization, and mass manufacturing," Opt. Express 26, No. 2, 1573-1585; 2018.
Plessey Semiconductors—White Paper: "The future of microLED displays using next-generation technologies"; 2018.
I. Friedler et al., "Solid-state single photon sources: the nanowire antenna," Opt. Express 17, No. 4, 2095-2110; 2009.
V. Shaoulov et al., "Design and assessment of microlenslet-array relay optics," Appl. Opt. 42, No. 34, 6838-6845; 2003.
D. Wu et al., "100% Fill-Factor Aspheric Microlens Arrays (AMLA) With Sub-20-nm Precision," IEEE Photon. Technol. Lett. 21, No. 20, 1535-1537; 2009.
G. Agranov et al., "Crosstalk and microlens study in a color CMOS image sensor," IEEE Trans. Electron. Dev. 50, No. 1, 4-11; 2003.
J. Ahn et al., "Advanced image sensor technology for pixel scaling down toward 1.0 μm," 2008 IEEE Intl. Electron. Dev. Meeting, 1-4; 2008.
Y. Huo et al., "Microlens performance limits in sub-2μm pixel CMOS image sensors," Opt. Express 18, No. 6, 5861-5872; 2010.
FOVI3D—Presentation: "Light-field Display Technical Deep Dive,"; 2019.
NHK STRL, "Research Trends on Holographic 3D Display Devices," Broadcast Technology, No. 62; 2015.
B. Groever et al., "Meta-Lens Doublet in the Visible Region," Nano Lett. 17, No. 8, 4902-4907; 2017.
S. R. Soomro et al., "Light-efficient augmented reality 3D display using highly transparent retro-reflective screen," Appl. Opt. 56, 6108-6113; 2017.
D. Cheng et al., "Design of a wide-angle, light-weight head-mounted display using free-form optics tiling," Opt. Lett. 36, 2098-2100; 2011.
IMEC Magazine: "Photolithography: a key technology for next-generation high-resolution AMOLED displays,"; 2016.

\* cited by examiner

3D LIGHT FIELD DISPLAYS UTILIZING MICRO-LED PIXEL ARRAYS AND METASURFACE MULTI-LENS ARRAYS

RELATED APPLICATIONS

This is the first application for the described technology.

FIELD

This disclosure relates generally to 3D displays and more specifically to 3D light field displays utilizing at least one of a micro-LED pixel array and a metasurface multi-lens array.

BACKGROUND

A three-dimensional (3D) display provides stereoscopic visual experience the same way as humans see the real world with two eyes. Humans can perceive a 3D environment and estimates distances to objects by analyzing both monocular and binocular visual information. The goal of a 3D display is to present the left and right views correctly and separately to each eye, where the "view" means the visual information taken from the specific viewpoint of an eye.

A 3D display may be a glass-type 3D (G3D) display or an autostereoscopic 3D (A3D) display. A G3D display utilizes some selective light blocking optical filters in front of the eyes to separate each view. For example with reference to FIG. 1, there is shown a G3D display 20 projecting both right eye view rays 22 and left eye view rays 24. A pair of 3D glasses 10 has a right optical filter 12, which permits right eye view rays 22 to pass therethrough to the right eye 4 and blocks the left eye view rays 24. Similarly, the pair of 3D glasses 10 has a left optical filter 14, which permits left eye view rays 24 to pass therethrough to the left eye 6 and blocks the right eye view rays 22. In some G3D displays, the right eye view rays 22 and the left eye view rays 24 have different and orthogonal polarization. For example, the right eye view rays 22 may be polarized at a 45-degree angle, while left eye view rays 24 may be polarized at a 135-degree angle. The right optical filter 12 may be a polarizing filter, which permits rays polarized at 45 degrees to pass therethrough while blocking other rays. The left optical filter 14 may be a polarizing filter, which permits rays polarized at 135 degrees to pass therethrough while blocking other rays. The different right and left views give the user a 3D effect. However, G3D displays are inconvenient to use since they require the use of eyewear.

An A3D display directs light rays from the display into several viewing zones. For example, with reference to FIG. 2, an A3D display 30 is shown directing light rays into three viewing zones: 32, 34 and 36. The right eye 4 sees rays corresponding to the view 36 while the left eye 6 sees rays from the view 32. Accordingly, the user experiences a 3D effect.

One type of A3D displays is a light field display. The key optical components of a 3D light field display are termed a "3D light field display module". In this disclosure, "a 3D light field display module" 40 is a hardware subsystem including a pixel array for the image/video light source, and a device that projects the different directional views, which can be for example a parallax barrier, a pinhole array or a multi-lens array (MLA). A "pixel array" is a two-dimensional grid of pixels, which define the form, and color of a digital image. In this disclosure, a "pixel" (picture element) refers to a physical dot on a display, which can illuminate and/or change color. The most common implementation of the pixel array is a liquid crystal display (LCD) that is a spatial light modulator (SLM), which requires the use of a backlight. An SLM is an object that imposes some form of spatially varying modulation on a beam of light. A backlight is a form of illumination used in LCD displays. The MLA is typically implemented with refractive micro-lenses, and it can be fabricated through different techniques such as grayscale lithography, thermal resist reflow, and polymer wetting on a plasma pre-treated substrate.

As an example, FIG. 3A is a simplified schematic drawing of a 3D light field display 40 module including a 3D LCD pixel array 54 optically coupled with a refractive MLA 60. In this figure, other components of the 3D LCD display such as the front glass panel are not shown. In this disclosure, when two objects are optically coupled, rays of light emitted by one object are directed to the other object. FIG. 3B is a close-up cross-sectional view of a portion of the light field display module 40 in which the 3D LCD 50 and its components, such as the LCD front glass panel 52, are showing. With reference to FIG. 3A and FIG. 3B (collectively "FIG. 3"), there is shown a 3D light field display module 40 which includes a 3D LCD 50 and a refractive MLA 60 bonded to the LCD front glass panel 52 of the 3D LCD 50. In one example, the refractive MLA 60 is a lenticular lens. The refractive MLA 60 comprises a plurality of refraction-based micro-lenses ("refractive lenslets") 62. A lenslet is a small lens. An MLA includes a set of lenslet in substantially the same plane. The lenslets of an MLA typically have the same focal length. The 3D LCD 50 has a 3D LCD pixel array 54 that is a spatial light modulator (SLM) which requires the use of an LCD backlight 45 emitting light that passes through the LCD back glass panel 59 towards the 3D LCD pixel array 54. The 3D LCD pixel array 54 includes 3D LCD pixels 56, each including three LCD pixels 58A, 58B, and 58C (collectively 58). Each refractive lenslet 62 of the refractive MLA covers a 3D LCD pixel 56 and is responsible for directing the light from each of the pixels 58A-58C to a different directional view (32-36). As discussed above, a user's right eye may see the view 34 while the left eye may see the view 32, which provides a 3D effect. The spatial resolution of the 3D light field display 40 is determined by the resolution of the refractive MLA 60, which is in turn set by the pitch of the refractive lenslets 62.

One drawback of LCDs is that they require backlight illumination, which means that the output image quality is not only dependent on the SLM but on the separate light source as well, thus leading to increased design complexity. Additionally, spectral filters must be used to display different colors, which adds to the thickness of the LCD. Since the 3D LCD pixels 56 cannot block the LCD backlight 45 completely, the contrast ratio is ultimately limited such that the display cannot attain "true black".

A refractive MLA 60 has several disadvantages. The focal length for refractive lenslets 62 cannot be smaller than a few mms. This poses a limit on the minimum distance between the MLA and the pixel array, and thus increases the thickness of the 3D light field display module 40. Refractive lenslets 62 have also been shown to exhibit aberrations, such as chromatic and spherical aberrations and astigmatism, which restrict the achievable resolution in the 3D light field display. To correct for aberrations, typically several refractive lenslets are stacked. This further increases the thickness and complexity of the 3D light field display module 40. The fabrication process of a refractive MLA 60 is significantly different from standard semiconductor fabrication processes, thus the process for manufacturing a 3D light field display is more expensive and complex.

Accordingly, a 3D light field display module 40 utilizing a 3D LCD 50 and a refractive MLA 60 may have significant drawbacks including low spatial and angular resolutions, a low contrast ratio, and a thick form factor. It is therefore desirable to provide a 3D light field display, which overcomes at least some of the aforementioned drawbacks.

SUMMARY

The present disclosure provides a 3D light field display module for use in a 3D light field display. The module utilizes a metasurface MLA to overcome problems with refractive MLAs such as chromatic aberrations.

In one aspect of the present disclosure, there is provided a 3D light field display module comprising a 3D pixel array, a metasurface MLA and an active matrix. The 3D pixel array includes a plurality of 3D pixels each, in turn, comprised of a plurality of pixels. The metasurface MLA has a plurality of metalenses, arranged on a substrate. The metasurface MLA is positioned parallel to the 3D pixel array, is spaced therefrom, and is arranged such that each that each metalens of the plurality of metalenses is opposite and aligned with a corresponding 3D pixel of the plurality of 3D pixels for directing incident light rays emitted by the 3D pixel to different views. The active matrix is electrically coupled to the 3D pixel array for activating the plurality of pixels. Advantageously, metalenses can be engineered to eliminate aberrations, which are intrinsic in refractive lenses. The focal length of a metalens can be designed to be less than 1 mm, thus the metasurface MLA can be close to the 3D pixel array which makes for a thin form factor 3D light field display. Moreover, a metasurface MLA can be manufactured using standard semiconductor fabrication processes.

In some embodiments, the 3D pixel array comprises a 3D liquid crystal display (LCD) pixel array, and the 3D light field display module further comprises a backlight and a spatial light modulator (SLM). The 3D LCD pixel array may include a plurality 3D LCD pixels and each 3D pixel may comprise a plurality of LCD pixels. Using a standard LCD reduces the product complexity and time-to-market since standard LCD technology is readily available.

In some embodiments, the 3D pixel array comprises a 3D micro-LED pixel array. The 3D micro-LED pixel array may include a plurality of 3D micro-LED pixels, and each 3D micro-LED pixel of the plurality of 3D micro-LED pixels comprises a plurality of micro-LED pixels. A micro-LED pixel array is self-emissive and thus serves the purpose of being both the light source and the spatial light modulator (SLM). Since the need for an SLM is averted, the 3D pixel array is significantly thinner than a comparable LCD pixel array thus reducing the overall form factor for the 3D light field display. A pixel pitch refers to the physical distance between the centers of two adjacent pixels on a display, and is therefore a measure of the density of pixels on the display. The pixel pitch of a micro-LED pixel array is small, compared to an LCD pixel array, thus facilitating building very high-resolution 3D light field display modules. A micro-LED pixel array has an excellent color rendering capability, high power efficiency, high contrast ratio, and features individually addressable pixels.

A metasurface MLA pitch refers to the physical distance between the centers of two adjacent lenslets and is a measure of the density of lenslets in the MLA. In one embodiment, the micro-LED pixels have a pitch of 10 μm and the metasurface MLA has a pitch of 150 μm. This is attainable with existing technology and provides a field of view of 60 degrees. In another embodiment, the micro-LEX pixels have a pitch of 0.95 μm and the metasurface MLA has a pitch of 120 μm. This is attainable with future technology and provides a field of view of 90 degrees. The micro-LED pixels each has divergence angle, and each of the 3D micro-LED pixels has an angular resolution larger than the divergence angle for reducing crosstalk between adjacent micro-LED pixels. The 3D light field display module has a field of view, which is based on the angular resolution. By varying the pitch, different applications are possible. For example, smartphone displays may require a different pitch than HD TV sets.

In some embodiment, the micro-LED pixels each comprises a plurality of nanowires arranged on a substrate. Nanowires have small diameters (hundreds of nano-meters) allowing a number of them to fit in 1 um by 1 um space thus enabling making a 1 μm micro-LED pixel.

In some embodiments, the nanowires are III-nitride nanowires or AlGaN nanowires, and the substrate comprises a TiO2 substrate.

In some embodiments, the nanowires have different diameters for emitting different colors. In some embodiments, the plurality of nanowires comprises three nanowires each emitting a primary color. Thus creating a colored pixel is simplified.

In some embodiments, the metasurface MLA is spaced from the 3D pixel array such that it is located at a focal length of the metalenses. Advantageously, this collimates the light emitted by the 3D pixels as they pass through the metalens thus reducing the divergence angle.

In some embodiments, the 3D light field display module further comprises a plurality of baffles located between adjacent 3D pixels of the plurality of 3D pixels. The baffles are arranged for preventing incident rays from an edge pixel of a first 3D pixel crossing into a second adjacent 3D pixel.

In some embodiments, the 3D light field display module further comprises a refractive MLA including a plurality of refractive lenslets. The refractive MLA is disposed between the 3D pixel array and the metasurface MLA. The plurality of refractive lenslets are aligned with the 3D pixels for collimating the incident light rays therefrom thus reducing the divergence angle.

In some embodiments, the metalenses comprise a plurality of nanofins oriented a different angles disposed on a substrate. The plurality of nanofins may comprise $TiO_2$ nanofins, and the substrate may comprise a glass ($SiO_2$) substrate.

In some embodiments, wherein the metalenses each comprises a first plurality of nanofins disposed on one side of a substrate and a second plurality of nanofins disposed on an opposite side of the substrate. This doublet structure reduces aberrations for incident light rays which are not perpendicular to the metalens.

In some embodiments, the active matrix comprises a vertically stacked thin film transistor (VST) active matrix. A VST has a small footprint thus allowing small 3D pixels to be made which results in a high-resolution 3D light field display.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

Figure 1:
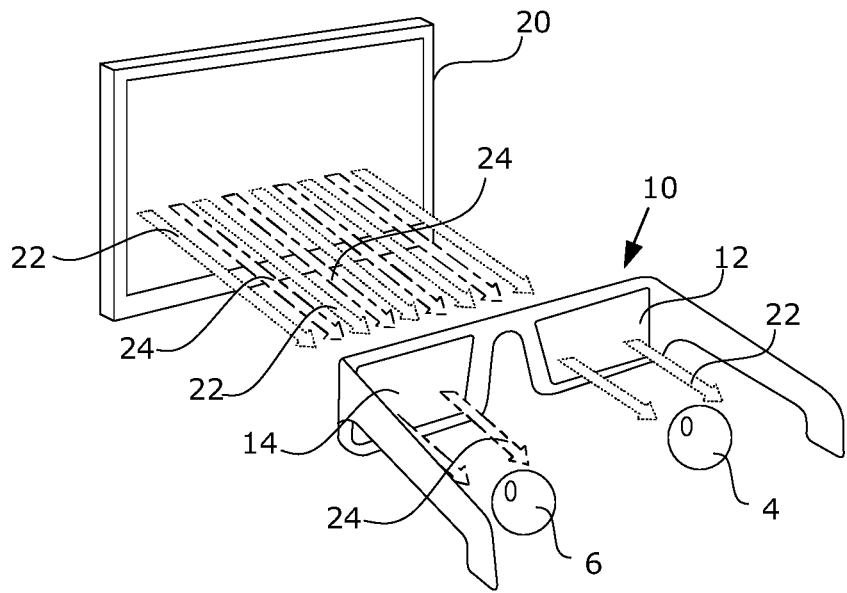
FIG. 1 is a perspective view of a prior art G3D display and a pair of 3D glasses associated therewith.
Figure 2:
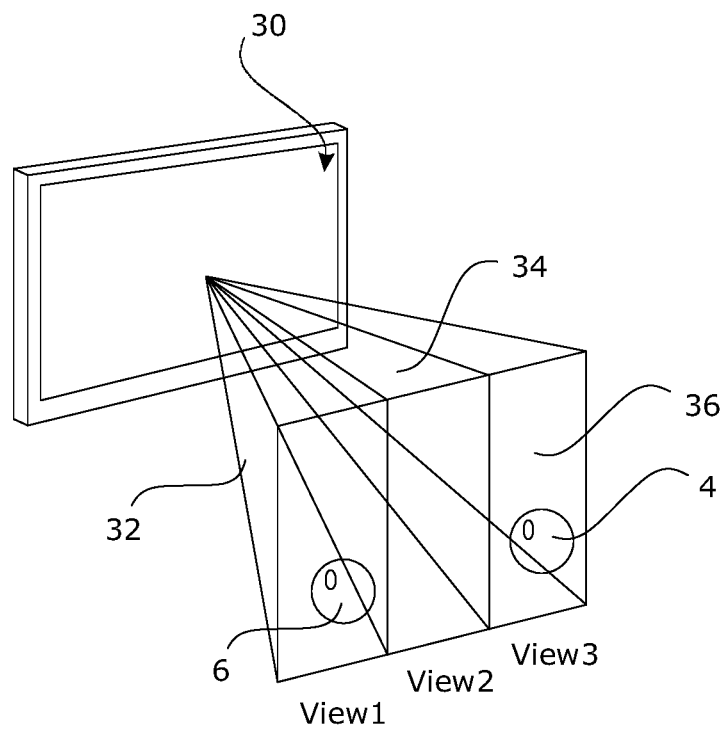
FIG. 2 is a perspective view of a prior art A3D display.
Figure 3A:
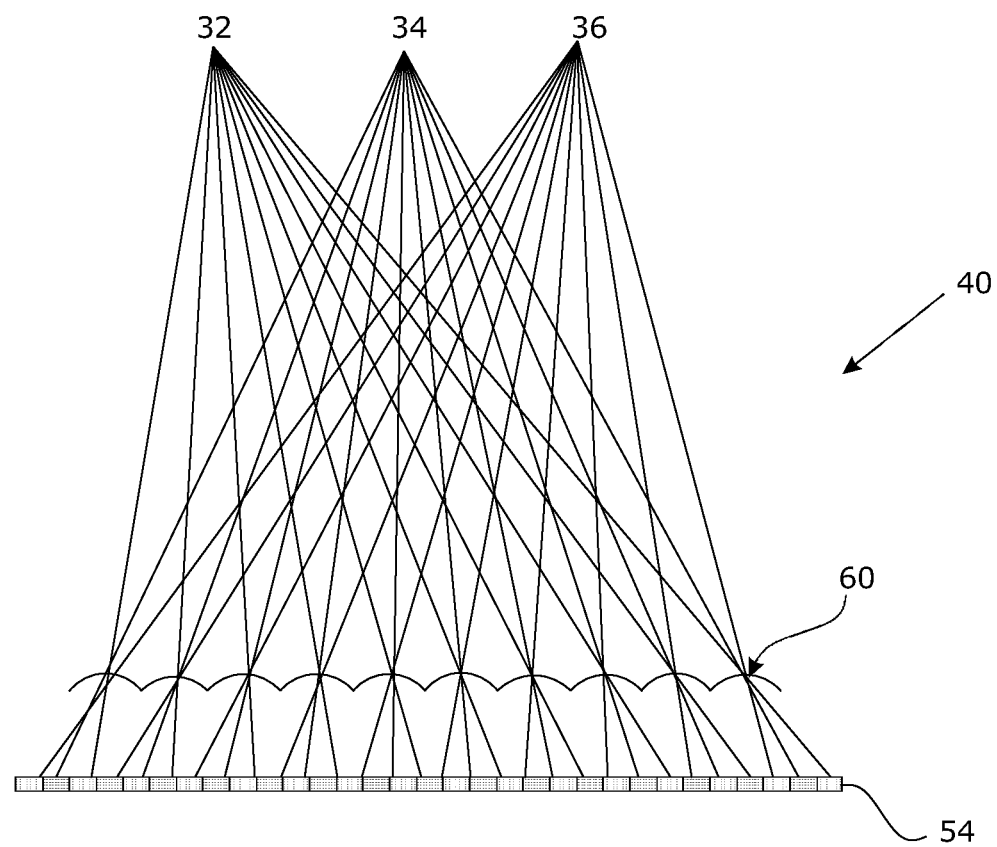
FIG. 3A is a schematic side view of a 3D light field display employing an LCD pixel array and a refractive MLA, and showing three views.
Figure 3B:
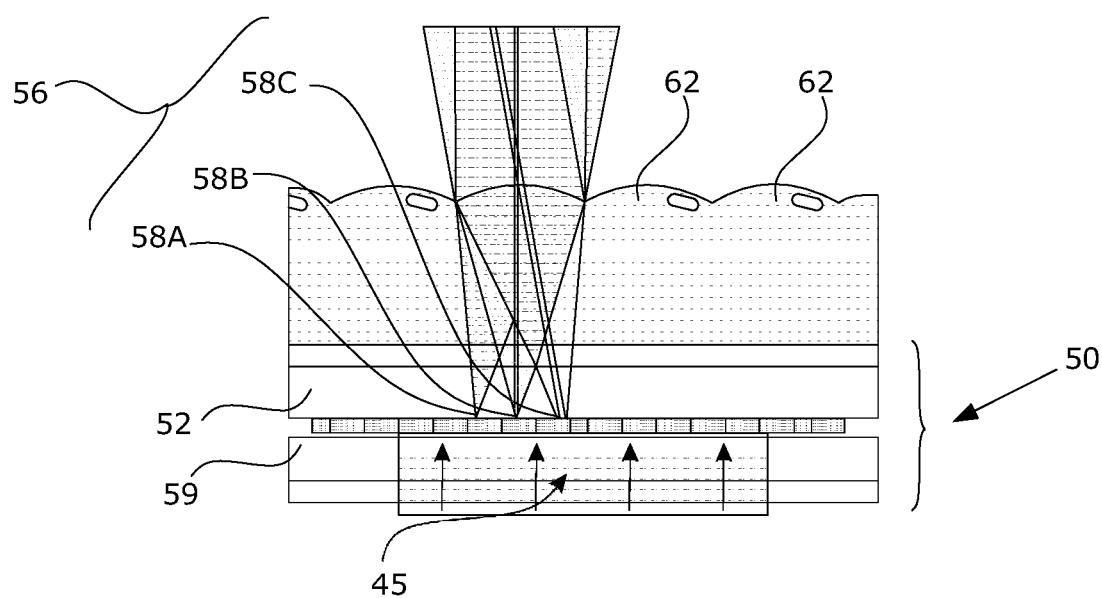
FIG. 3B is close-up sectional view of a portion of the 3D light field display of FIG. 3A.

Example embodiments are described herein that may in some applications overcome the drawbacks of prior art light field display. In some embodiments, a 3D micro light emitting diode ("micro-LED") pixel array 140 is used instead of a 3D LCD pixel array 54 in a 3D light field display module 40. In some embodiments, a metasurface multi-lens array (MLA) 200 is used instead of a refractive MLA 60 to produce the different views, which give the 3D effect to the light field display. A description of the aforementioned technologies and example embodiments follow.

In this disclosure, a 3D pixel includes a plurality of pixels each projecting a different view. For example, a 3D pixel projecting three views includes 3 pixels in the linear dimension or 3×3 (i.e. 9) pixels.

In this disclosure, a micro-LED pixel 110 is a pixel utilizing LED technology. A 3D micro-LED pixel 142 includes a plurality of micro-LED pixels 110 each projecting a different view.

Figure 9:
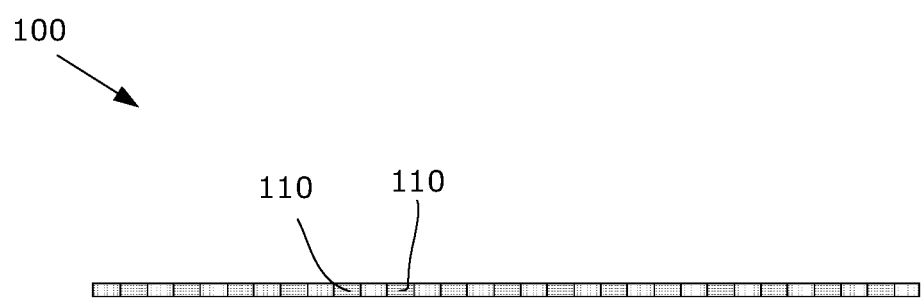
FIG. 9 is a schematic diagram of a micro-LED pixel array including micro-LED pixels similar to those shown in FIG. 8B.

In this disclosure, a micro-LED pixel array 100 includes a plurality of micro-LED pixels 110, as shown in FIG. 9.

In this disclosure, a 3D micro-LED pixel array 140 includes a plurality of 3D micro-LED pixels 142. A 3D micro-LED pixel array 140 has the same structure as a micro-LED pixel array 100, but software is configured to light up the different micro-LED pixels 110 of each 3D micro-LED pixel 142 to project different views.

A micro-LED pixel array 100 is self-emissive and thus serves the purpose of being both the light source and the spatial light modulator (SLM). In some embodiments, the pixel pitch of a micro-LED pixel array 100 may be 1 µm thus facilitating building very high-resolution 3D light field display modules 40. A micro-LED pixel array 100 has an excellent color rendering capability, high power efficiency, high contrast ratio, and features individually addressable pixels as will be discussed herein.

Figure 4:
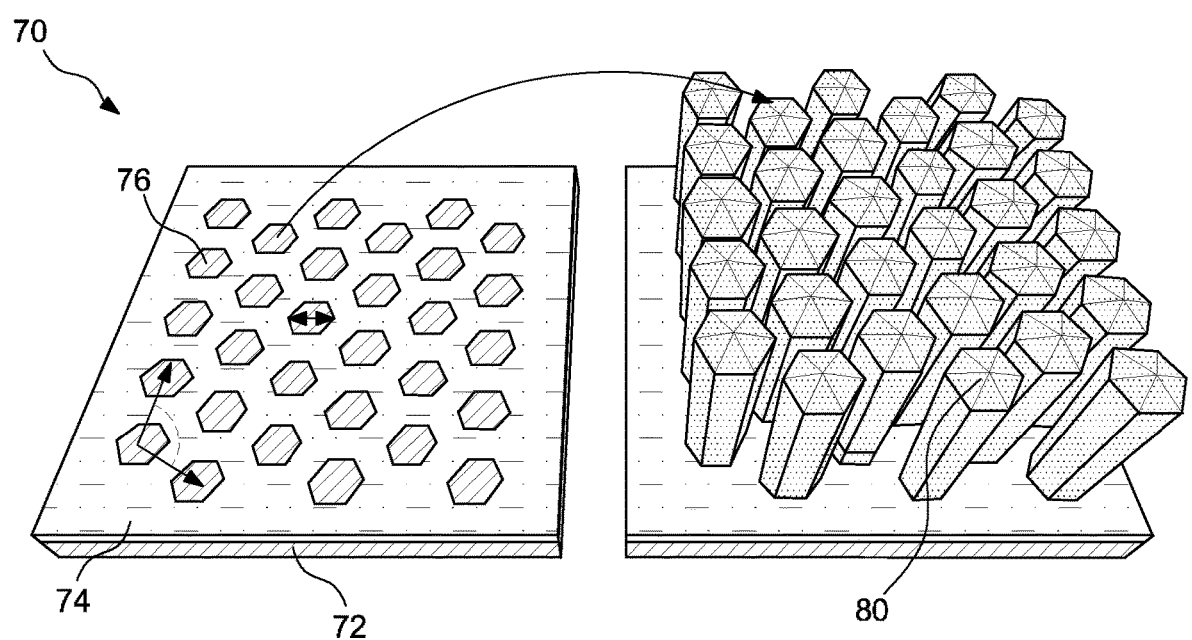
FIG. 4 is a schematic of the selective area growth (SAG) of III-nitride nanowires by with molecular beam epitaxy (MBE)
Figure 5:
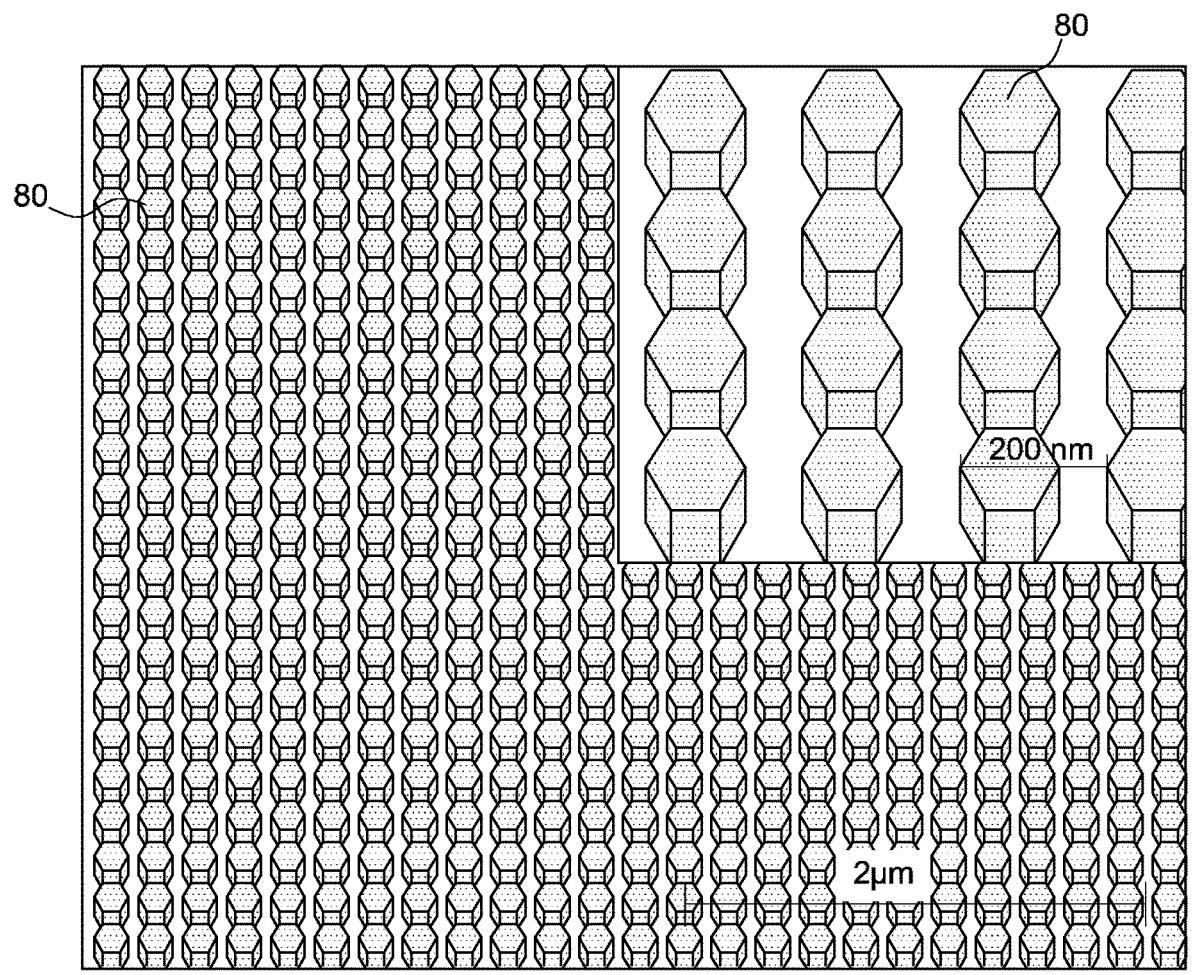
FIG. 5 is a scanning electron microscope (SEM) image of AlGaN nanowires grown by SAG with MBE.
Figure 6:
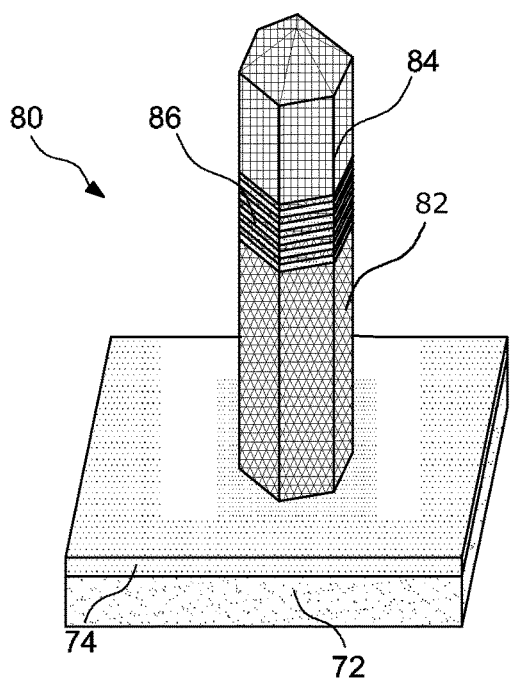
FIG. 6 is a perspective view of an InGaN single-nanowire LED.

In one example embodiment, a micro-LED pixel array 100 comprises a plurality of III-nitride semiconductor nanowires ("nanowires") 80 on a substrate 72, such as a silicon-on-sapphire substrate. In this disclosure, a "substrate" refers to a supporting material on which a circuit is formed or fabricated. A substrate may be strictly planar, substantially planar, or otherwise shaped. The nanowires 80 can be grown by several techniques, including chemical vapor deposition (CVD), metalorganic vapor phase epitaxy/metalorganic CVD, and molecular beam epitaxy (MBE). Furthermore, a selective area growth (SAG) process, whereby electron-beam lithography is used to pre-pattern the substrate, can be utilized to produce nanowires with precisely controlled size, spacing, and morphology. For example, FIG. 4 shows a schematic for a process 70 of selective area growth of III-nitride nanowires by MBE. Nanoscale patterns 76 are created on a growth mask layer 74, which may be a Ti mask layer. The growth mask layer 74, which is placed on a substrate 72 such as a Si or GaN-on-sapphire template. The growth process is driven by the different chemistries of the impinged atoms on the surface of the substrate 72 and the surface of the mask layer 74. Highly formed nanowires 80 are formed as shown. FIG. 5 is an SEM image of GaN nanowires 80 grown by an SAG process. Each nanowire 80 is about 200 nm in diameter. With reference to FIG. 6, each nanowire 80 includes an n-GaN segment 82, a p-GaN segment 84 and a plurality of quantum dots 86.

Figure 7:
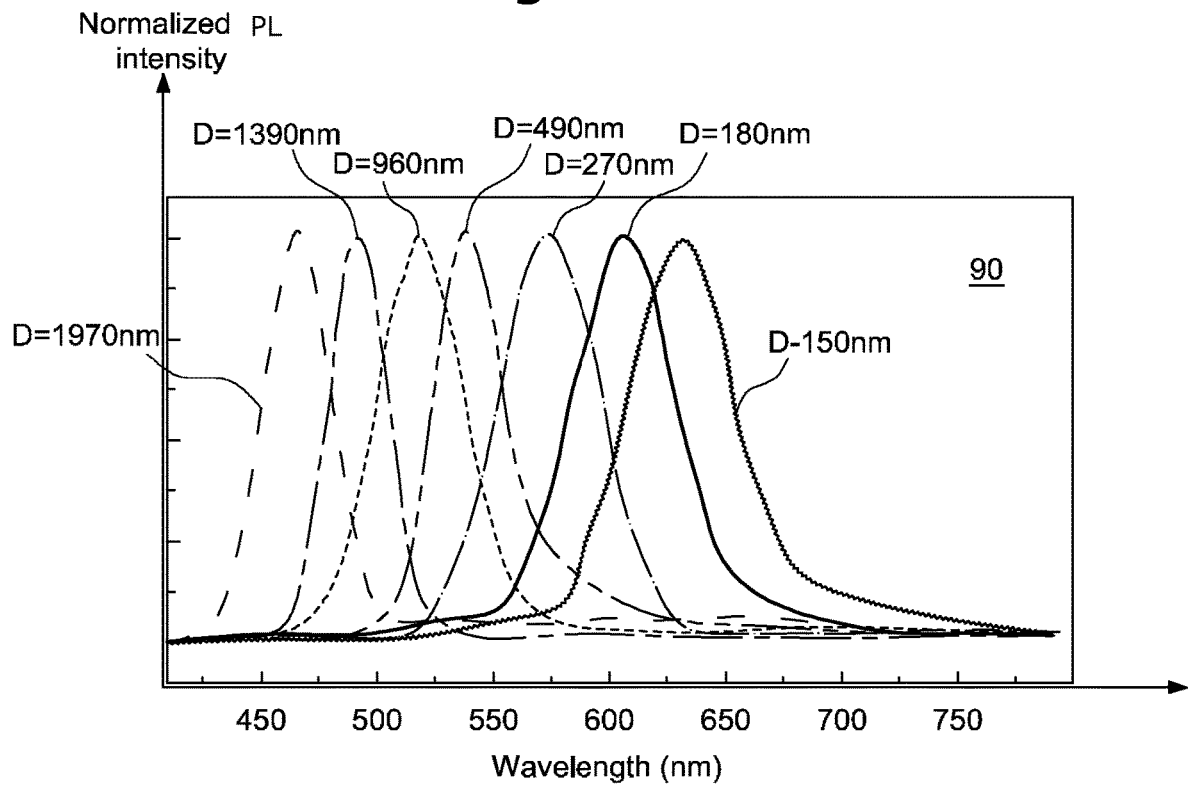
FIG. 7 is a graph showing a normalized photoluminescence (PL) spectra of InGaN single nanowires with different diameters.

The diameter of each nanowire 80 determines the emission color. FIG. 7 depicts a graph 90 correlating normalized photoluminescence (PL) intensity with nanowire diameters. A nanowire 80 having a diameter of 150 nm produces red emissions. However, a nanowire of diameter 180 nm produces orange emissions, a nanowire of diameter 270 nm produces yellow emissions, a nanowire of diameter 490 produces green emissions, a nanowire of diameter 960 nm produces cyan emissions, a nanowire of diameter 1390 nm produces light blue emissions, and a nanowire of diameter 1970 nm produces blue emissions.

Figure 8A:
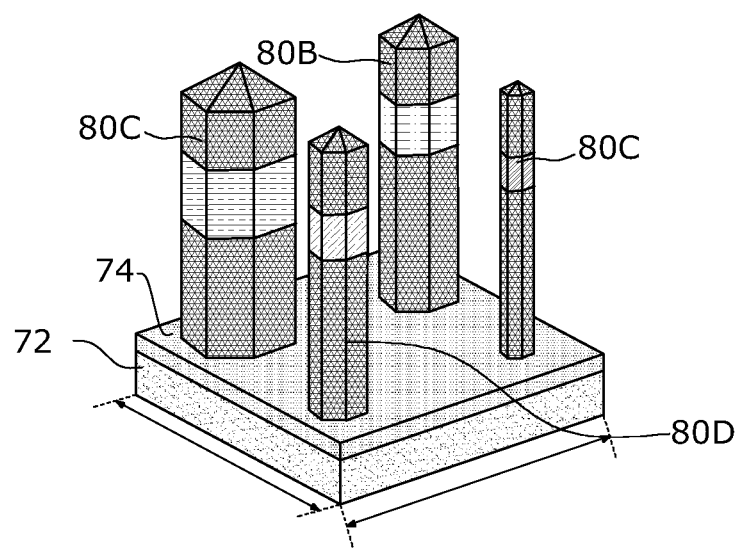
FIG. 8A is a perspective view of four nanowires having different diameters made by a single epitaxy step.
Figure 8B:
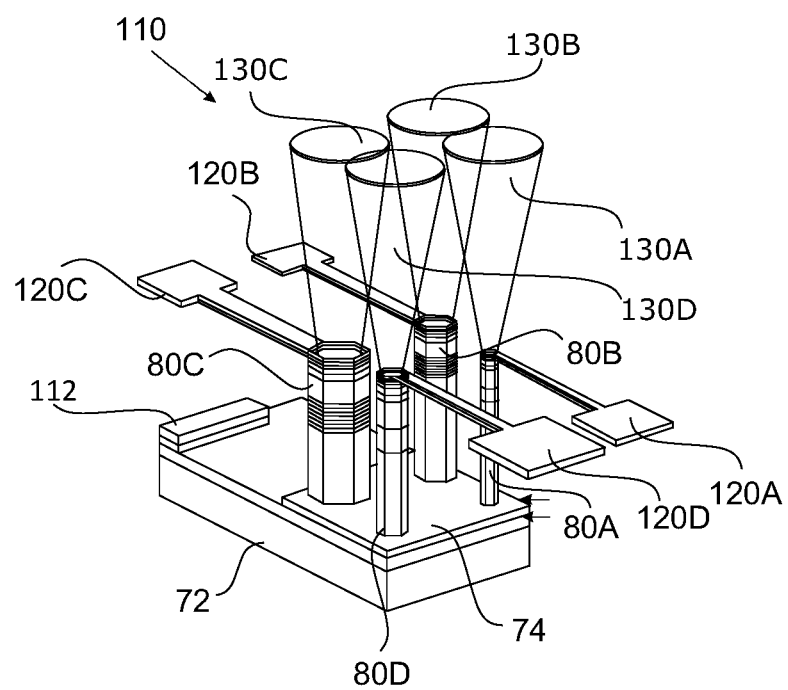
FIG. 8B is a schematic illustration of a monolithically integrated multicolor nanowire micro-LED pixel including four nanowires of different diameters similar to the four nanowires of FIG. 8A.

As indicated above, the diameter of a nanowire 80 is of the order of 100s of nanometers. Accordingly, several nanowires 80 can fit into a 1 µm×1 µm area. Therefore, an individual micro-LED pixel 110 can have a size of 1 µm. In some embodiments, a micro-LED pixel 110 uses a single InGaN nanowire for each emission. For example, with reference to FIG. 8A, four nanowires 80A-80D of different diameters are shown on a substrate 72. The nanowire 80A has red emissions, the nanowire 80B has green emissions, the nanowire 80C has blue emissions, and the nanowire 80D has orange emissions. FIG. 8B shows a micro-LED pixel 110 having four nanowires 80A-80D similar to those of FIG. 8A. Each nanowire 80 in FIG. 8B is shown connected to a p-contact 120. Nanowire 80A is connected to a p-contact 120A and produces red emissions 130A. Nanowire 80B is connected to a p-contact 120B and produces green emissions 130B. Nanowire 80C is connected to a p-contact 120C and produces blue emissions 130C. Nanowire 80D is connected to a p-contact 120D and produces orange emissions 130D. An individual nanowire 80 can be activated by applying power between its respective p-contact 120 and the n-contact 112 shown formed on top of the substrate 72 and the Ti mask layer 74.

Figure 10:
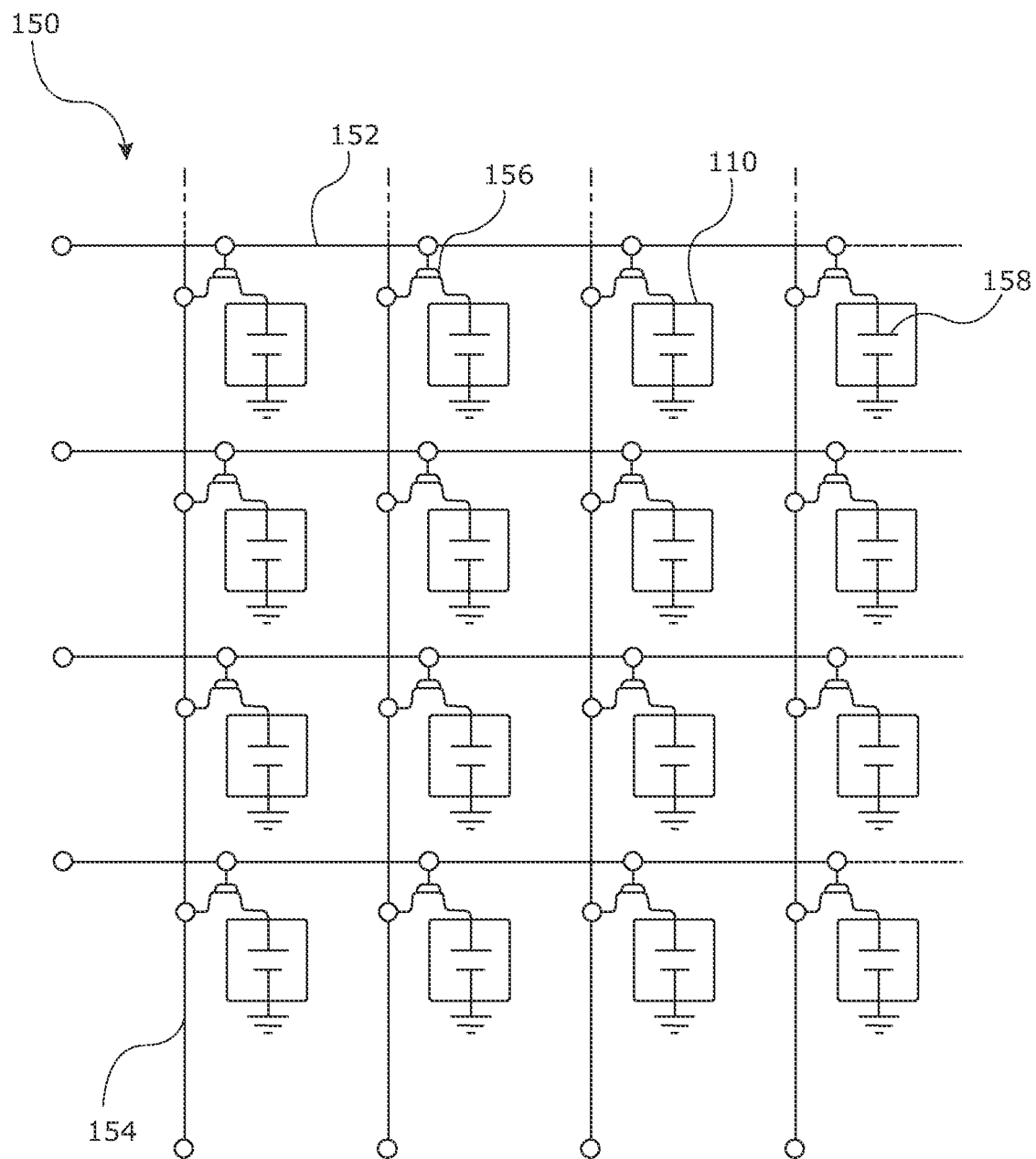
FIG. 10 is an active matrix having thin film transistors (TFT) used with LCD displays.

In order to turn the micro-LED pixels 110 of a 3D light field display module 40 on and off or otherwise vary the light output, typically, an active matrix is utilized. Active-matrix is technology which uses a matrix of thin film transistors (TFTs) and capacitors to control the image produced by a display module. With reference to FIG. 10, there is shown an active matrix 150 electrically coupled (electrically linked, e.g., capable of sharing electric power or sending or receiving electrical signals) to the micro-LED pixels 110 of a micro-LED pixel array for activating and deactivating the micro-LED pixels 110. In this disclosure, when a first component is electrically coupled to a second component, it means they are electrically connected such that current or electric charge may flow from the first component to the second component or vice versa. The micro-LED pixels 110 are arranged in a matrix with row electrodes ("rows") 152 and column electrodes ("columns") 154. A thin-film transistor (TFT) 156 built into each micro-LED pixel 110, at the cross point of the row electrodes 152 and column electrodes 154. A capacitor 158 is also electrically coupled to each micro-LED pixel 110 with the ability to hold a charge fora limited period of time. Each micro-LED pixel 110 can be individually addressed by applying an electrical signal to the row 152 and column 154 that correspond to the specific micro-LED pixel 110 position. The TFT 156 acts as a switch, precisely controlling the voltage of each micro-LED pixel 110. To activate a specific micro-LED pixel 110, first, a control signal is applied to the row 152 where the micro-LED pixel 110 is located. This disables the TFTs 156 located at that row 152 and enables the flow of charge from the column 154. Thus, by applying an appropriate voltage potential to a specific column electrode 154, the respective capacitor 158 is charged and the respective micro-LED pixel 110 is activated. In some embodiments, the charge on the capacitor 158 determines the intensity of illumination of a respective micro-LED pixel. Once a row 152 is updated, the thin-film transistors 156 are changed back to their active state and the following row 152 in the matrix can be addressed: the active matrix 150 is updated one row at a time. The updating procedure is repeated until all the rows 152 in the matrix have been addressed.

For simplicity, the active matrix 150 of FIG. 10 has been shown to have a single TFT 156 and capacitor 158 per pixel. However, since each micro-LED pixel 110 includes a plurality of nanowires each configured to emit a particular color, a similar number of TFTs 156 and capacitors 158 may be required per micro-LED pixel. For example, with reference to the micro-LED pixel 110 of FIG. 8B, which has 4 nanowires 80A-80D, 4 TFTs 156 and capacitors 158 would be needed to control the micro-LED pixel 110. Each capacitor 158 would be electrically coupled to a corresponding p-contact of the p-contacts 120A-120D of the 4 nanowires 80A-80D.

The conventional configuration of the oxide TFT in an active matrix is the back-channel-etched (BCE) TFT, which has been widely adopted for pixel pitches down to 3 µm. In some embodiments, the conventional active matrix employing TFT technology is adequate. However, for higher resolution light field displays where it is desired to have a 1-µm-pitch pixel it is considerably more difficult to integrate signal lines and switching transistors in a 1-µm-pitch pixel using TFT technology. In such embodiments, a vertically stacked thin-film transistor (VST) can be used instead of TFT technology in order to achieve building such dense pixel arrays.

Nanowire micro-LEDs 110 are self-emissive. Accordingly, they can be used to construct 3D light field display modules 40 that achieve a contrast ratio of infinity (true black). Furthermore, a 3D light field display module 40, which employs nanowire micro-LEDs 110, does not require a separate backlight for illumination thus reducing the 3D light field display form factor. Micro-LED nanowires 80 have been demonstrated to exhibit tunability across the entire visible spectral range (~450 to 700 nm), correlated color temperature (CCT) values variable from ~1900 to 6800 K, and high color rendering index of ~94 (wherein the full scale is from 0 to 100). The power consumption of a display employing nanowire micro-LEDs is estimated to be about 10% that of LCDs and 50% of that of organic LEDs (OLEDs). The fabrication processes for the semiconductor nanowire micro-LEDs 110 are standard within complementary metal oxide semiconductor (CMOS) foundries, and thus they can be integrated with silicon (Si) electronics used to drive the nanowire micro-LEDs 110. There is also great potential to scale the technology up to high volume production.

Figure 11:
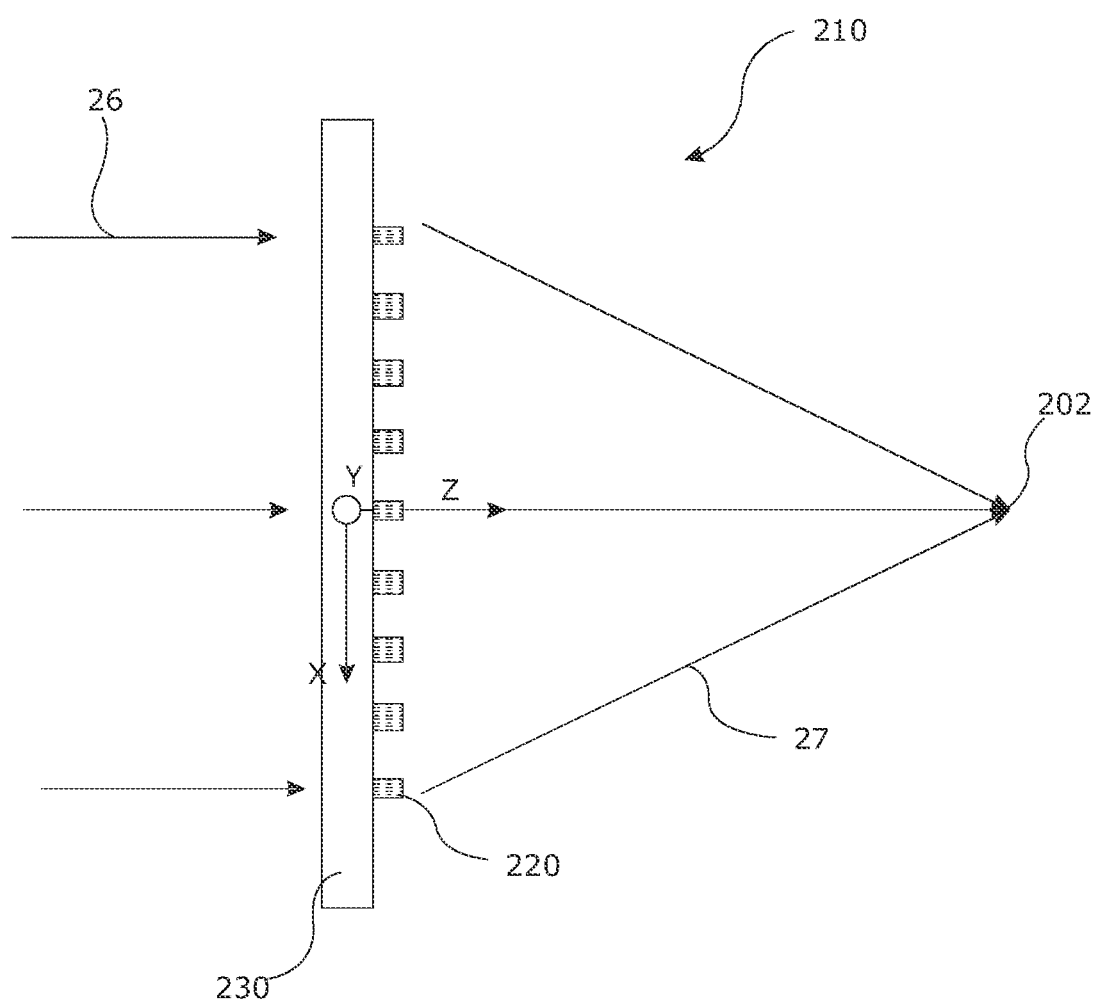
FIG. 11 is a schematic illustration of a metalens focusing a plurality of parallel rays.
Figure 12A:
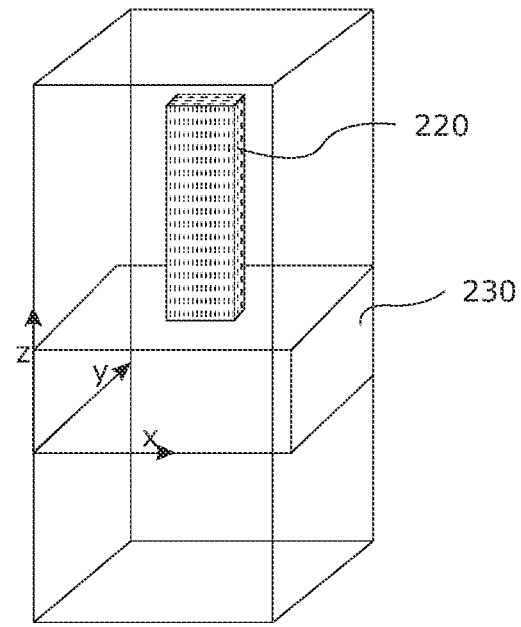
FIG. 12A is a perspective view of a $TiO_2$ nanofin.
Figure 12B:
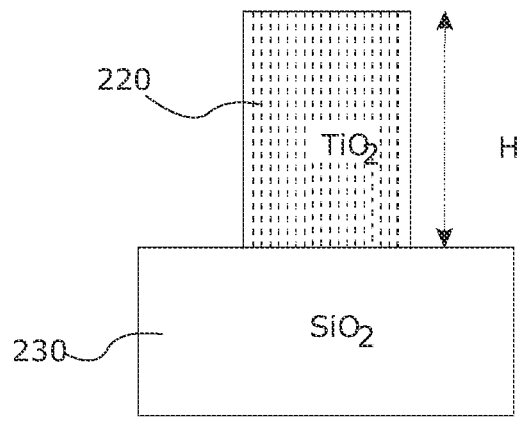
FIG. 12B is a front view of the $TiO_2$ nanofin of FIG. 13A.
Figure 12C:
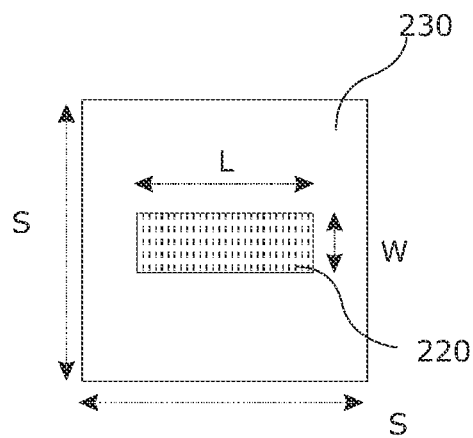
FIG. 12C is a top view of the $TiO_2$ nanofin of FIG. 13A.
Figure 12D:
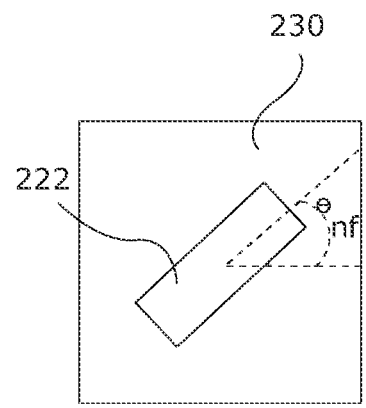
FIG. 12D is a top view of a $TiO_2$ nanofin rotated by an angle to impart a phase shift on rays of light.
Figure 13:
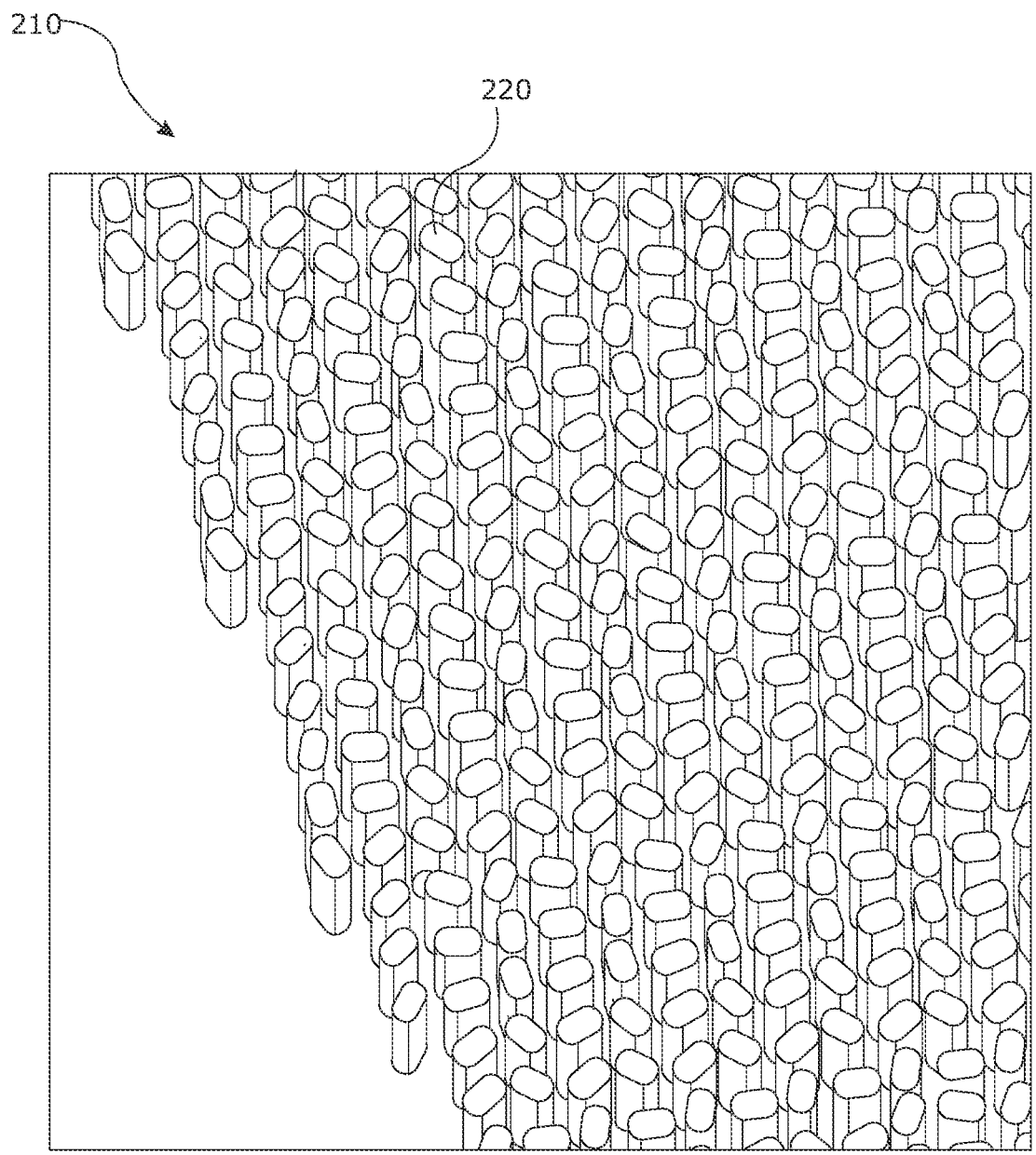
FIG. 13 is a Scanning Electron Microscope (SEM) image of a metalens.

A metasurface comprises a flat substrate patterned with either dielectric or metallic nanostructures that can manipulate the amplitude, phase, and polarization of incident light at subwavelength spatial resolution. By engineering a metasurface such that the phase imparted on a perpendicularly incident light beam varies continuously as a function of distance from the center, it would function as a lens, known as a metasurface lens or simply "metalens" 210. A metalens 210 focuses an incident light beam to a focal point a certain distance away from the metasurface. For example, with reference to FIG. 11, there is shown a metalens 210 includes a plurality of nanofins 220 on a glass substrate 230. When parallel incident light rays 26 passing through the metalens 210 they are focused onto the focal point 202 as refracted rays 27. FIGS. 12A-12C show a single $TiO_2$ nanofin 220 on a glass ($SiO_2$) substrate 230. The phase change imparted on a ray of light by a single nanofin is determined by an angle of rotation of that nanofin in the X-Y plane. For example, with reference to FIG. 12D, a nanofin 222 is shown at an angle $\theta_{nf}$ in the X-Y plane. FIG. 13 shows an SEM micrograph of a fabricated metalens 210 including a plurality of $TiO_2$ nanofins 220 oriented at different angles of rotation in the X-Y plane. A multi-lens array (MLA) can be constructed using a plurality of the described metalenses 210 as the building block, and is referred to as a metasurface multi-lens array ("metasurface MLA"). The metasurface MLA 200 can replace the refractive MLA 60 in a 3D light field display module 40.

A metasurface MLA 200, which is constructed of a plurality of metalenses 210, provides a number of improvements over a refractive MLA 60. A metalens 210 can be engineered to have a focal length that is <1 mm and in some cases the focal length can be <100 µm. Accordingly, a metasurface MLA 200, constructed from metalenses 210, can be positioned close to a display, such as a 3D LCD 50 or a 3D micro-LED pixel array 140. The close spacing between the metasurface MLA 200 and the 3D micro-LED pixel array 140 enables manufacturing a 3D light field display module 40 with a thin form factor.

Figure 14A:
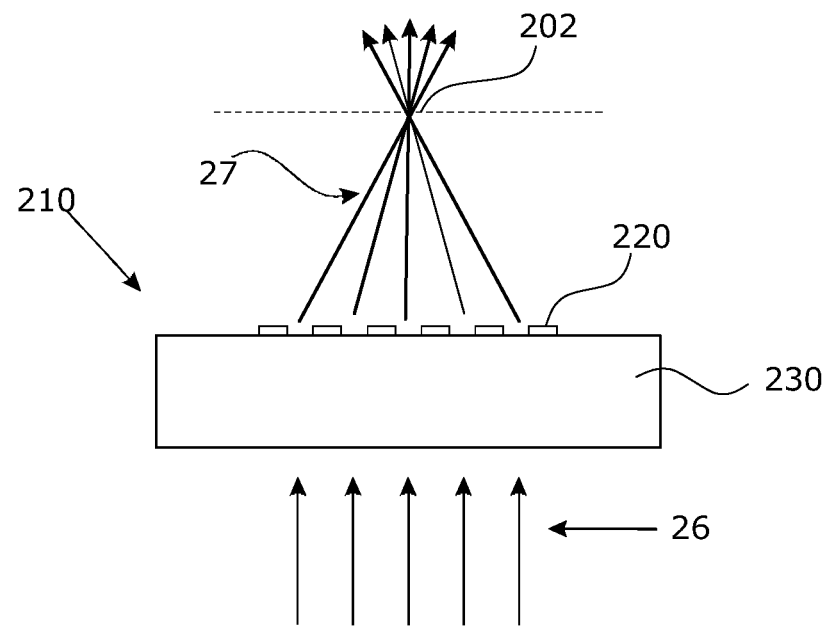
FIG. 14A is a diagram depicting perpendicular incident rays passing through a single-sided metalens.
Figure 14B:
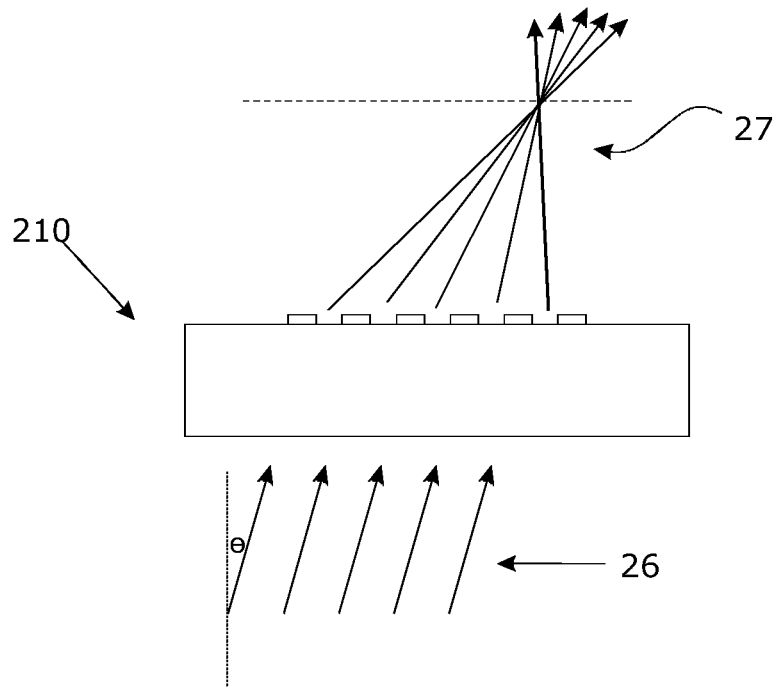
FIG. 14B is a diagram depicting inclined incident rays passing through the single-sided metalens of FIG. 14A.
Figure 15A:
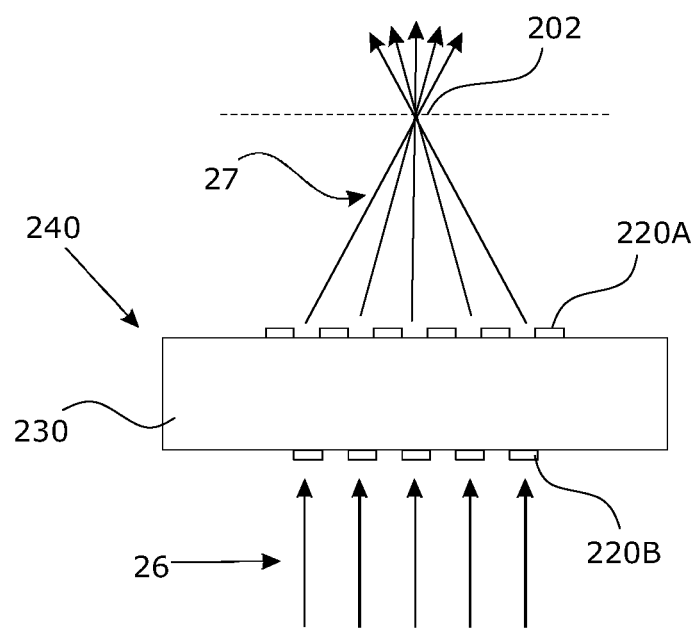
FIG. 15A is a diagram depicting perpendicular incident rays passing through a single-sided metalens.
Figure 15B:
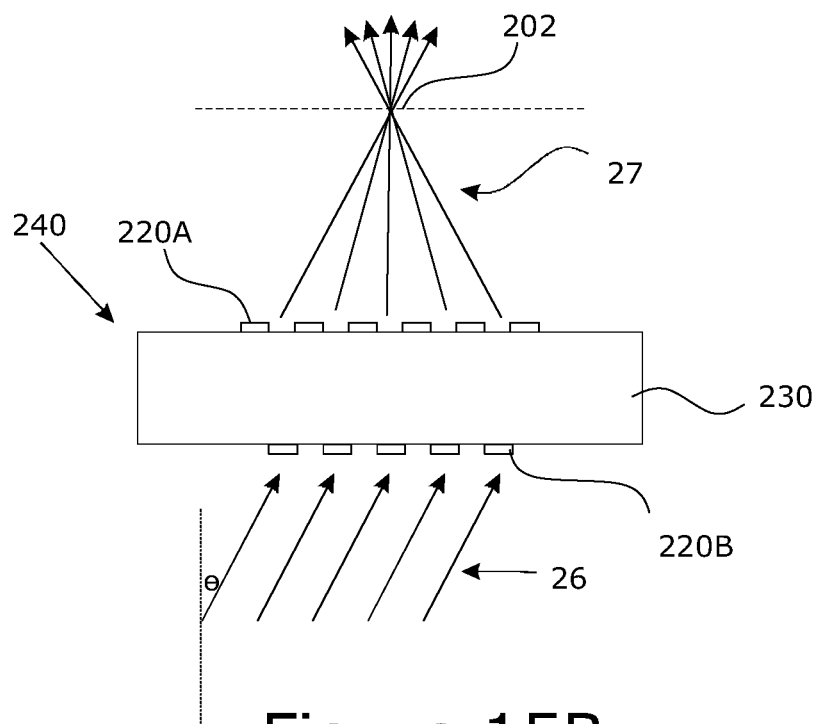
FIG. 15B is a diagram depicting inclined incident rays passing through the single-sided metalens of FIG. 15A.

A metalens 210 can also be engineered to be polarization insensitive and to reduce or eliminate aberrations. In some embodiments, a metasurface lens array doublet, which comprises two metasurface MLAs 200 on both sides of a thin substrate, is used. It has been shown that doublet metalenses remove monochromatic aberrations better than single metalenses. First, with reference to FIGS. 14A and 14B, there is shown a metalens 210 with nanofins 220 disposed on one side of a substrate 230 thereof. In FIG. 14A a plurality of incident rays 26 are perpendicular to the metalens 210. The refracted rays 27 are shown converging to the focal point 202 of the metalens 210. In FIG. 14B, the plurality of incident rays 26 are inclined by an angle A with respect to the metalens 210. The refracted rays 27 are not all converging to a focal point 202. This is known as achromatic aberrations. Using a doublet lens 240, as seen in FIGS. 15A and 15B seems to address the problem. With reference to FIGS. 14A and 14B, there is shown a doublet metalens 240 having a first plurality of nanofins 220A disposed on one side of a substrate 230 and second plurality of nanofins 220B disposed on the opposite side of the substrate 230. It has been shown that parallel incident light rays 26 falling perpendicular as in FIG. 15A and at an angle as in FIG. 15B are refracted as refracted rays 27 with little to no monochromatic aberrations, as indicated by the fact that all refracted rays 27 converge at the focal point 202 of the doublet metalens 240. Further engineering and optimization can produce a metasurface doublet lens ("doublet metalens") 240 that is chromatic and monochromatic aberrations-free, polarization insensitive, highly efficient, and with a small focal length.

Unlike refractive lenses that have curved profiles, metasurface lenses have a planar form factor, which means that they can be fabricated with standard semiconductor manufacturing processes by single-step lithography for each metasurface, thus enabling the scaling to large volumes. Current CMOS electronics fabrication can reach feature sizes down to a few nm, so the high-resolution photolithography can also be applied to patterning metasurfaces that require such nanoscale structures.

Figure 16:
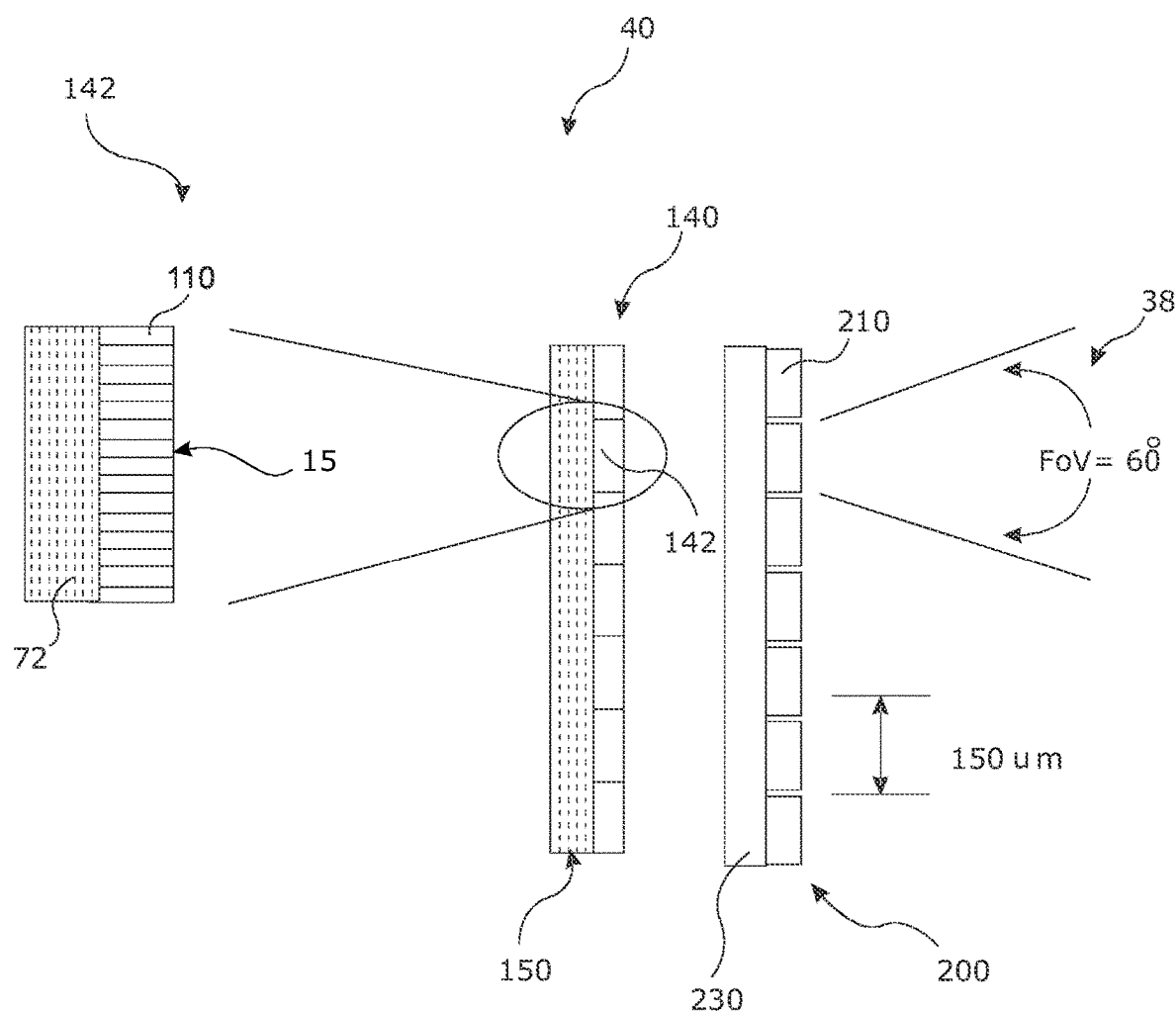
FIG. 16 is a diagram depicting the main components of a 3D light field display including a 3D micro-LED pixel array and metasurface multi-lens array, in accordance with embodiments of the present disclosure.

In one example embodiment of the present disclosure, a 3D light field display module 40 is shown in FIG. 16. The 3D light field display module 40 includes a 3D micro-LED pixel array 140 and a metasurface MLA 200. The 3D micro-LED pixel array 140 includes a plurality of 3D micro-LED pixels 142. Each 3D micro-LED pixel 142 includes a plurality of micro-LED pixels 110. For example, in the depicted embodiment, a 3D micro-LED pixel 142 includes 15 micro-LED pixels 110 on a substrate 72. The metasurface MLA 200 is disposed opposite and parallel to the 3D micro-LED pixel array 140. The metasurface MLA 200 is aligned with the 3D micro-LED pixel array 140, such that each 3D micro-LED pixel is aligned with a respective metalens 210. In some embodiments, the 3D micro-LED pixel array 140 and the metasurface MLA 200 are spaced apart by a distance, which is equal to the focal length of each of the metalenses 210. In the depicted embodiment of FIG. 16, there are 15×15 (i.e. 225) micro-LED pixels 110 in each 3D micro-LED pixel 142. Each micro-LED pixel 110 has a divergence angle of light of 3 degrees. The divergence angle of a micro-LED pixel 110 emitting a light beam is an angular measure of the increase in the light beam diameter with the distance from the micro-LED pixel 110. To avoid interference between the light projected by adjacent micro-LED pixels 110, an angular resolution of 4 degrees is set therebetween. In other words, there is a 1-degree separation between the projected light of each two adjacent micro-LED pixels 110. With an angular resolution of 4 degrees, and 15 micro-LED pixels 110 per 3D micro-LED pixel 142, the total field of view for a 3D micro-LED pixel is 60 degrees. Accordingly, there are 15 possible views per direction for each 3D micro-LED pixel 142, with each view being about 4 degrees wide. Each 3D micro-LED pixel 142 is aligned with a corresponding metalens 210. The metalens 210 has a similar size to the 3D micro-LED pixels 142. In the depicted embodiment, the micro-LED pixel is 10 µm. Accordingly, the metalens 210 has a pitch of 15 micro-LED pixels or 150 µm. Table 1 shows the specifications of the light field display module 40 depicted in FIG. 16.

TABLE 1

Specifications of light field display of FIG. 16

| Parameter | Target specification |
|---|---|
| Pixel array pitch | 10 µm |
| MLA pitch | 150 µm (15 × 15 pixels for each metalens) |
| Angular resolution | 4°/view |
| Field of view (FoV) | 60° (15 views in each direction) |
| Divergence angle of light of each view, full-width half-maximum (FWHM) | 3° |

The micro-LED pixels 110, which are made of nanowires 80, described above, are used to implement the 3D micro-LED pixels 142 of the 3D micro-LED pixel array 100. The micro-LED pixels can be engineered to attain the desired characteristics of infinite contras ratio (true blue), wavelength tunability across the entire visible spectral range, and correlated color temperature (CCT) values (1800 to 6800K). The micro-LED pixels also provide a color rendering index, which is greater than 90. The power consumption of a micro-LED pixel array 100 is only 10% that of a comparable LCD display.

In order to attain high image quality, avoid blurring, and color distortion, certain characteristics of the metasurface MLA 200 are desirable. The metasurface MLA 200 needs to have the desired characteristic of being achromatic over the visible range. The metasurface MLA 200 also needs to be polarization insensitive in that the focal length and the focused image do not change appreciably as a function of polarization. Metalenses 210 correct for monochromatic aberrations. The focal length of the metalens 210 and the focused image do not change appreciably as a function of the incident angle for incident angle ranges of 0 to 30 degrees. Accordingly, a field of view of 60 degrees is attainable using the metasurface MLA 200, without aberrations.

Figure 17:
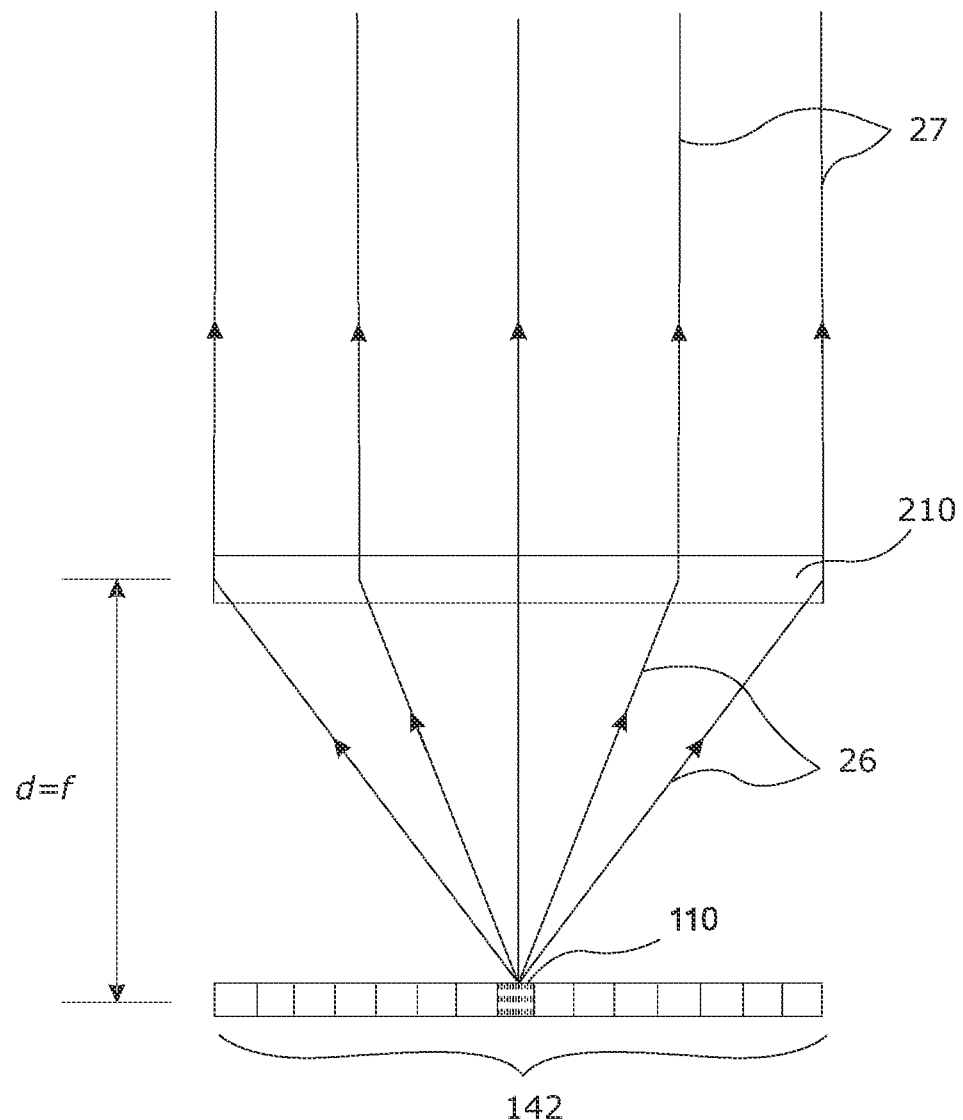
FIG. 17 illustrates an arrangement of a 3D micro-LED pixel includes a plurality of micro-LED pixels, and a metalens spaced apart by a distance, which is equal to the focal length of the metalens to produce collimated rays.

As mentioned above, the divergence angle (full-width half-maximum or "FWHM") of light emitted from each micro-LED pixel is 3 degrees. This is dictated by the divergence angle emitted by the individual nanowires 80 that make up the micro-LED pixel 110. The divergence angle of each nanowire 80 can be tuned by varying the size and shape of the nanowire, and by tapering it. Due to the subwavelength size of each nanowire 80, it may be difficult to reduce the emitted light divergence angle further simply by tuning the geometry of the nanowire 80 itself. However, the metalens 210 of the metasurface MLA 200, which is aligned with a particular 3D micro-LED pixel 142 serves to reduce the divergence angle. By placing the metasurface MLA 200 at a distance d that is equal to the focal length f of the metalens 210, the light emitted from the 3D micro-LED pixel 142 beneath it would be ideally collimated with no divergence. FIG. 17 illustrates an arrangement of the 3D micro-LED pixel 142 and metalens 210 spaced apart by a distance d, which is equal to the focal length f of the metalens 210. This arrangement leads to collimation of the emitted light rays 26 as collimated rays 27. In practice, slight variations of the distance d between the 3D micro-LED pixel array 140 and the metasurface MLA 200, deviations of the fabricated metasurface MLA 200 from the ideal design, and also the finite size of each micro-LED pixel 110 means that the divergence angle would still be non-zero. For the present embodiment, the errors in the fabrication of the metasurface MLA 200 and its alignment with the 3D micro-LED pixel array 140 must be such that the divergence angle of the light emitted from a micro-LED pixel 110 after passing through the metalens 210 is less than or equal to 3 degrees.

In a practical implementation of a 3D light field display module 40, each metalens 210 of the metasurface MLA 200 covers a number of micro-LED pixels 110, which collectively form a 3D micro-LED pixel 142. Light emitted from the micro-LED pixels 110 which are close to the boundaries of a second metalens 210B end up reaching an adjacent first metalens 210A. This is demonstrated in FIG. 18. Two adjacent 3D micro-LED pixels 142A and 142B are shown. A first metalens 210A is opposite and is aligned with the 3D micro-LED pixel 142A and a second metalens 210B is opposite and is aligned with the 3D micro-LED pixel 142B. As can be seen, the two incident rays 26-1 and 26-2 which are transmitted by a micro-LED pixel 110 of the second 3D micro-LED pixel 142B, are projected onto the first metalens 210A instead of the second metalens 210B, thus causing undesirable crosstalk.

Figure 18:
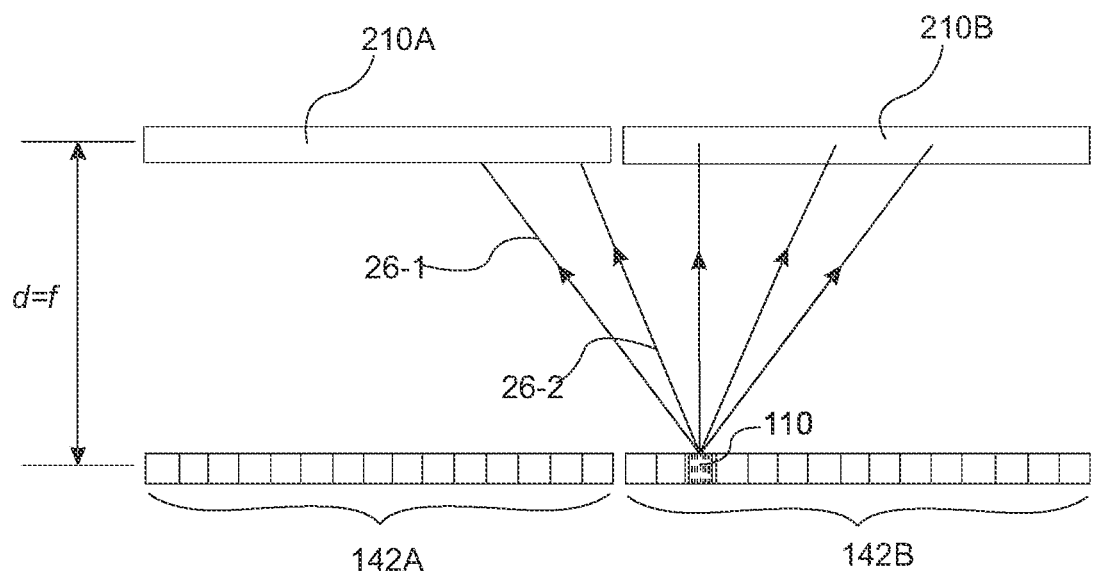
FIG. 18 is a diagram demonstrating cross-talk of rays emitted by micro-LED pixels near the edge of a 3D micro-LED pixel onto an adjacent metalens.
Figure 19:
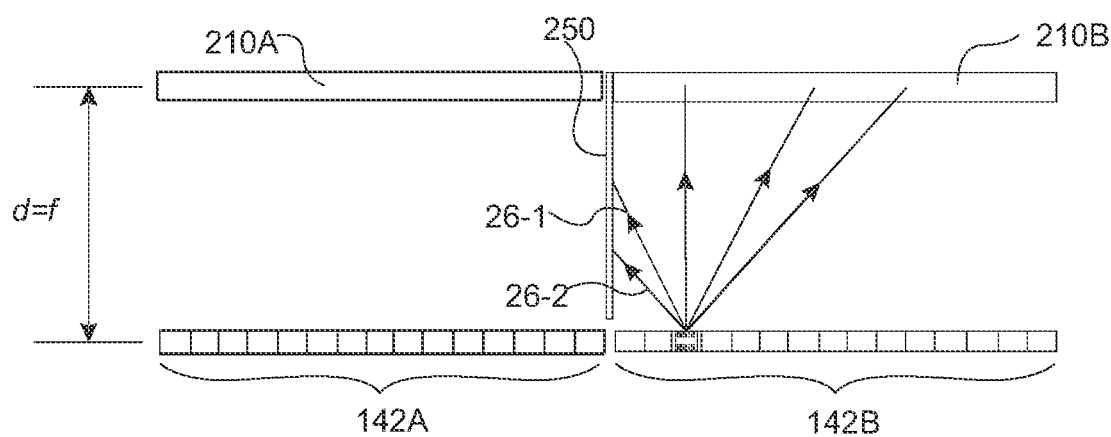
FIG. 19 is a diagram demonstrating the use of a baffle between two adjacent metalenses to address the cross-talk shown in FIG. 18.

In one example embodiment, the problem of crosstalk shown in FIG. 18 is solved by using baffles between adjacent metalenses 210. With reference to FIG. 19, there is shown a baffle 250 between the first metalens 210A and the second metalens 210B, which is adjacent the first metalens 210A. The baffle 250 is made of an opaque material that blocks the incident rays 26-1 and 26-2 thus preventing them from interfering with the 3D micro-LED pixel 142A and its corresponding first metalens 210A. The baffle 250 causes the micro-LED pixels 110 closest thereto to be dimmer than the ones closer to the center of the second metalens 210B due to the fact that only a fraction of the light reaches the second metalens 210B while the remaining portion (e.g. incident ray 26-1 and incident ray 26-2) is blocked.

Figure 20:
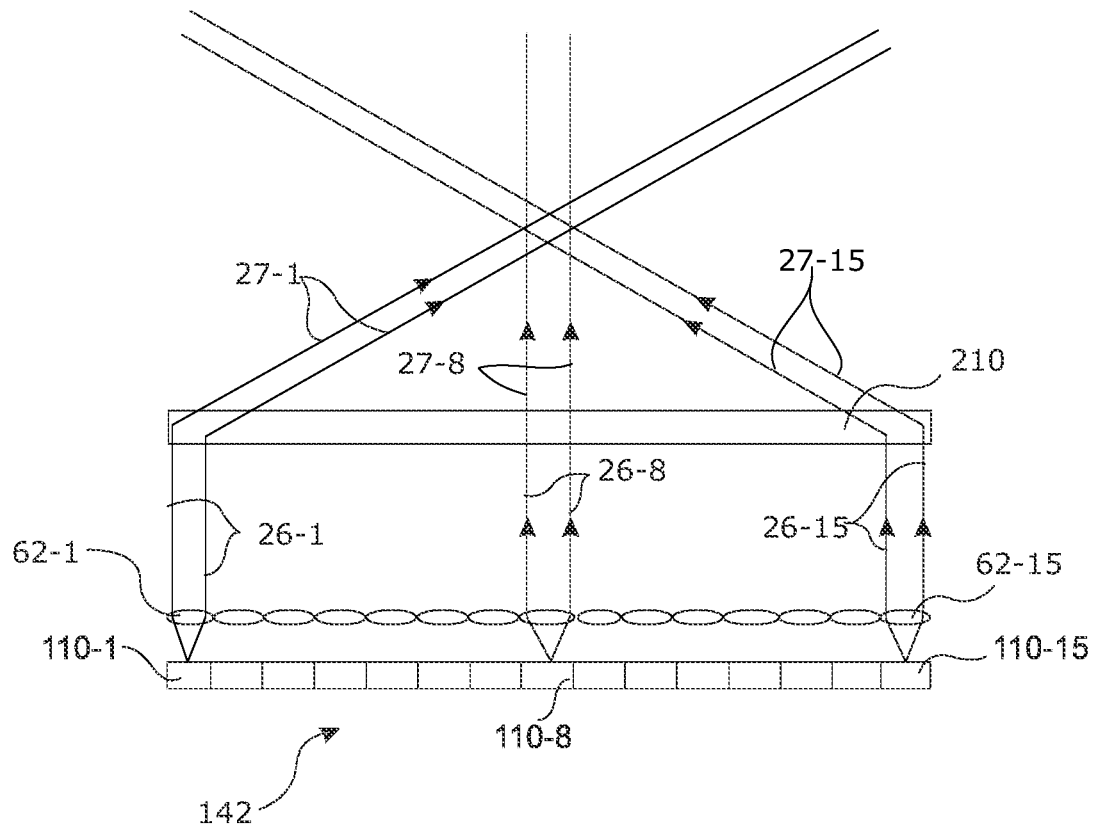
FIG. 20 is a diagram depicting the use of a plurality of lenslets aligned with the plurality of micro-LED pixels of a 3D micro-LED pixel to collimate rays emitted by the micro-LED pixels to eliminate cross-talk with adjacent metalenses.

In another example embodiment, the problem of crosstalk is solved by collimating the light emitted from each individual micro-LED pixel 110 by using a refractive MLA including refractive lenslets 62 aligned with the micro-LED pixels 110 and placed such that each micro-LED pixel 110 is at the focal length of a corresponding refractive lenslet 62. In this arrangement, incident rays from each micro-LED pixel 110 are refracted as collimated rays which are directed to the metalens 210 corresponding to the 3D micro-LED pixel comprising the micro-LED pixels 110. This is shown with reference to FIG. 20. A 3D micro-LED pixel 142 includes 15 micro-LED pixels 110-1 through 110-15 (collectively "110"). The micro-LED pixels 110 project micro-LED incident rays 25 towards a plurality of refractive lenslets 62-1 through 62-15 (collectively "62"). The refractive MLA is arranged parallel to the micro-LED pixels 110 and spaced therefrom such that each micro-LED pixel 110 is at the focal length of a corresponding refractive lenslet 62. As a result of this arrangement, the refractive lenslets 62 refract the micro-LED incident rays 25 and directs them as collimated incident rays 26 towards the metalens 210. As can be seen in FIG. 20, the central incident light rays 26-8 are collimated and perpendicular to the metalens 210 as before. Additionally, the micro-LED incident rays 25 from the edge micro-LED pixel 110-1, which pass through the refractive lenslet 62-1 become collimated as incident rays 26-1 by the refractive lenslet 62-1 and are directed in a perpendicular direction to the metalens 210 thus eliminating cross-talk with an adjacent 3D micro-LED pixel 142. The same is true for the micro-LED incident rays 25 from the edge pixel 110-15, which are collimated by refractive lenslet 62-15 to become incident rays 26-15 which are perpendicular to the metalens 210 thus eliminating cross-talk with an adjacent 3D micro-LED pixel 142. The metalens 210 redirects the incident rays 26-1, 26-8 and 26-15 as refracted rays 27-1, 27-8 and 27-15, respectively. As a result, different views are produced from the single 3D micro-LED pixel 142. While FIG. 20 shows the rays from only three micro-LED pixels 110-1, 110-8, 110-15 it is understood that every micro-LED pixel 110 produces micro-LED incident rays 25 towards a corresponding refractive lenslet 62 and that the refractive lenslet 62 directs the rays as collimated and perpendicular incident rays 26 on the metalens 210. The refractive lenslets 62 may be refractive lenses having diameters of a few microns and are thus suitable for collimating the micro-LED light rays emitted from each micro-LED pixel 110.

The 3D light field display module 40 described above with reference to FIG. 16 addresses some of the problems cited above with respect to the prior art. Since a 3D micro-LED pixel array 140 is self-emissive, the display does not require a separate backlight or a spatial light modulator (SLM). By utilizing nanowire-based micro-LED pixels 110, the contrast ratio can be infinity (i.e. giving "true black") which is a major improvement when compared with the limited contrast ratio of LCD displays. The micro-LED pixels 110 can also be scaled down to 1 μm, which allows for higher display resolution. The use of metalenses 210 to direct the incident rays 26 to project different views is advantageous for many reasons. Metalenses 210 can be engineered to eliminate aberrations, which are intrinsic in refractive lenses, including chromatic aberrations, spherical aberrations, coma and astigmatism. Furthermore, the focal length (f) of a metalens 210 can be designed to be less than 1 mm. By placing the metasurface MLA 200 at a distance of 1 mm from the 3D micro-LED pixel array 140, the overall display form factor becomes very thin. Additionally, the fabrication of a metasurface MLA 200 can be done by standard semiconductor fabrication processes thus reducing complexity and cost of manufacturing of the 3D light field display module 40.

Figure 21:
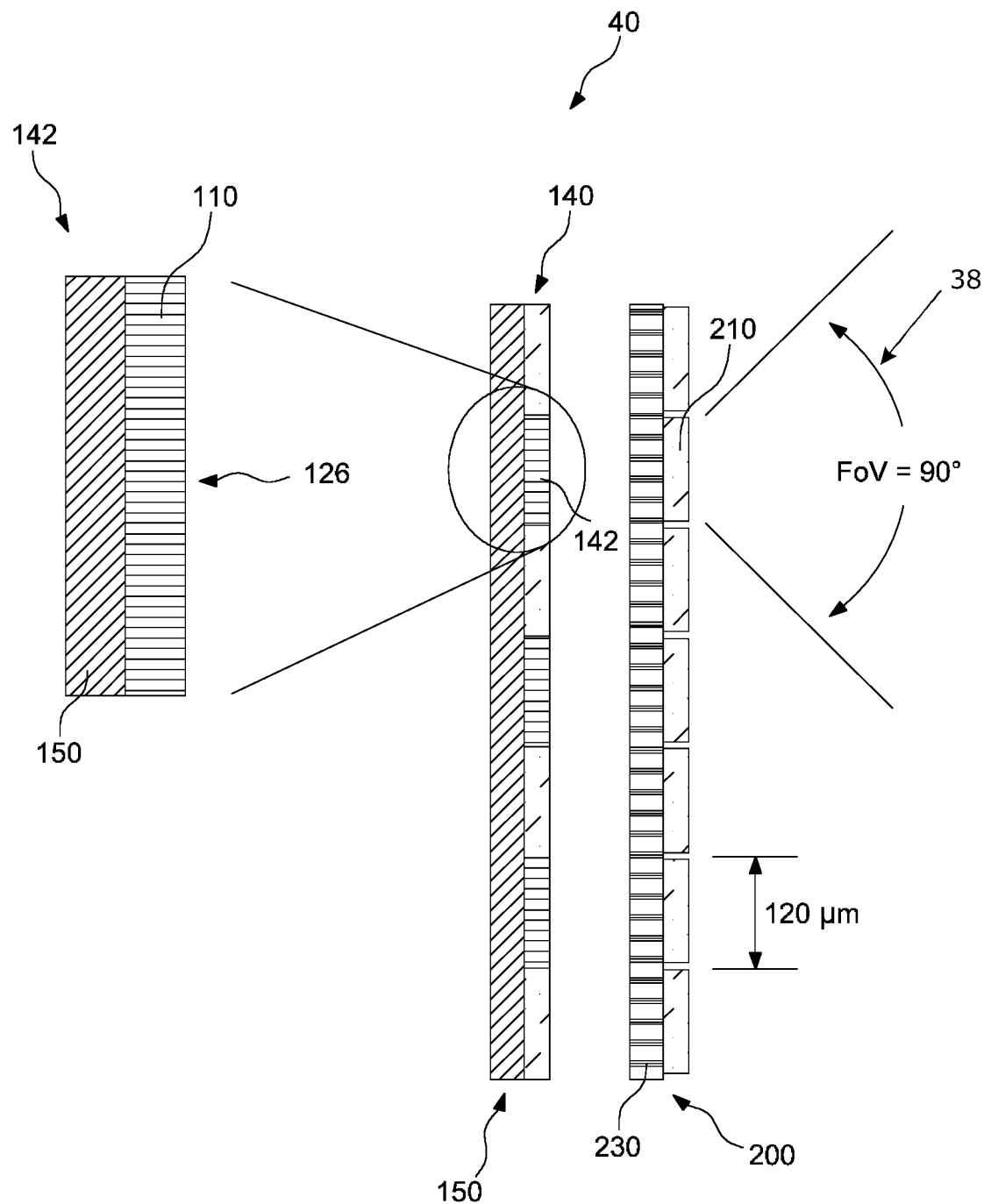
FIG. 21 is a diagram depicting the main components of a 3D light field display including a 3D micro-LED pixel array and metasurface multi-lens array, in accordance with embodiments of the present disclosure.

The 3D light field display module 40 described in FIG. 16 can be manufactured with currently available technology. In another example embodiment, using technology that will likely be available in around 5 years, a 3D light field display module 40 as described in FIG. 21 is provided. Two variations of this embodiment are described; one for a smartphone form factor and the other is for a TV form factor. The structure of the 3D light field display module 40 of FIG. 21 is similar to that of FIG. 16 with some differences. The micro-LED pixel 110 pitch is 0.95 μm. This pitch is the same for both smartphone and TV form factor implementations. This small pixel size means that each micro-LED pixel 110 contains only three nanowires 80 each emitting one of the primary colors (red, green and blue). This implementation of the micro-LED pixel 110 is possible since the diameter of each nanowire 80 is only hundreds of nm. As mentioned earlier, micro-LED pixels 110 having a size of the order of 1 μm can be electrically coupled with an advanced type of TFT known as a vertically stacked thin film transistor (VST) active matrix for activating the individual pixels.

For a smartphone form factor, the metasurface MLA 200 pitch is 120 μm. Accordingly, each metalens 210 can receive light rays from 120/0.95=126 micro-LED pixels 110. In other words, each metalens 210 faces 126×126 micro-LED pixels 110. Accordingly, a 3D micro-LED pixel 142 has 126×126 micro-LED pixels 110 and can provide, in cooperation with the corresponding metalens 210, 126 views. For the smartphone form factor, the divergence angle of each view is 0.5 degrees. To avoid crosstalk, the angular resolution is larger than the divergence angle and is set to 0.71. As a result, the field of view (FoV) 38 is the product of the number of views and the angular resolution of each view or 126×0.71=89.46 or approximately 90 degrees.

For a TV form factor, the metasurface MLA 200 pitch is 900 μm. Since the micro-LED pixel array pitch is 0.95, then each metalens 210 can project light from 945×945 micro-LED pixels 110. In other words, each 3D micro-LED pixel 152 has 945×945 micro-LED pixels 110 and therefore can provide 945 views. For this TV form factor the divergence angle is only 0.09 and the angular resolution is 0.095. Accordingly, the field of view (FoV) 38 is 945×0.095=89.78 or approximately 90 degrees.

The specifications of the 3D light field display module 40 of FIG. 21 is listed below in Table 2, for both the smartphone and TV form factors.

TABLE 2

Specification for 3D light field display of FIG. 21

| Parameter | Target specification |
|---|---|
| Pixel array pitch | 0.95 μm |
| MLA pitch | Smartphone: 120 μm |
| | (126 × 126 pixels each lenslet) |
| | TV: 900 μm |
| | (945 × 945 pixels each lenslet) |
| Angular resolution | 0.71°/view (smartphone) |
| | 0.095/view (TV) |
| Field of view (FoV) | 90° |
| | 126 views in each direction (smartphone) |
| | 945 views in each direction (TV) |
| Divergence angle of light of each view (FWHM) | 0.5° (smartphone), 0.09° (TV) |

The FoV 38 is set to 90° to have comparable performance with current 3D light field displays. The metasurface MLA 200 pitch is chosen to meet the minimal requirement of the angular resolution limit of the human eye, which is $\theta e=0.3$ mrad (milli-radians). For an observation distance of $Z_v=0.4$ m that is typical for smartphone usage, the metalens 210 would not be distinguishable for a metasurface MLA 200 pitch of $p=0.4\times\sin(0.3 \text{ mrad})=120$ μm. However, when viewing a TV that is typically at a distance of $Z_v=3.0$ m, the metasurface MLA 200 pitch should be $p=3.0\times\sin(0.3 \text{ mrad})=900$ μm. These sizes of metalenses 210 are readily attainable as shown by previous work. The angular resolution is set so that at least one view is always observed by each eye (i.e. at least one ray passes through the eye's pupil). This means that the resolution of the rays at the viewer's plane Δv should be less than or equal to the diameter of the eye's pupil de that is ~5 mm. Given that:

$$\Delta v = zv\delta\theta, \quad (1)$$

$$\delta\theta \geq \phi/N, \quad (2)$$

where δθ is the angular resolution, φ is the FoV 38, and N is the number of views in one dimension (number of micro-LED pixels 110 for a single metalens 210 in one dimension). As such, the number of pixels N is given by $$N \geq \phi zv/de. \quad (3)$$

For the smartphone usage case, N≥126, which means that the maximum pixel pitch pp~0.95 μm given that the metasurface 200 MLA pitch p=120 μm. For a TV, N≥945 implies that the maximum pixel pitch is also pp~0.95 μm given the larger MLA pitch of p=950 μm. The angular resolutions for the smartphone and TV usage cases are 0.71° and 0.095°, respectively. The maximum divergence angle of the light for each view is chosen to be slightly less than the angular resolution, as shown in Table 2.

The technological advantages of the embodiment of a 3D light field display module 40 as described with reference to FIG. 21 is similar to that of the embodiment of FIG. 16, in addition to the superior performance in terms of resolution and the number of 3D views.

Figure 22:
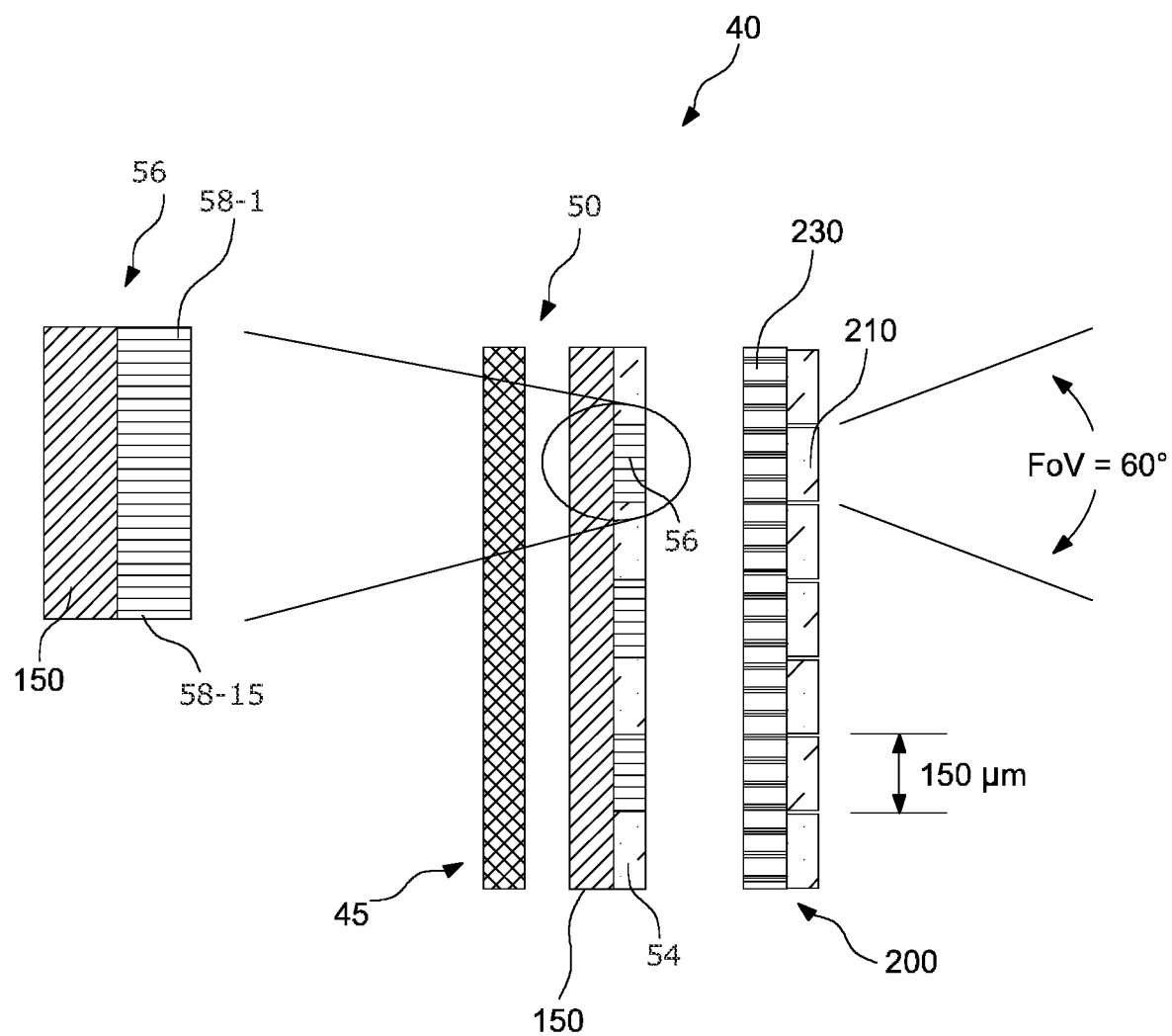
FIG. 22 is a diagram depicting the main components of a 3D light field display including a 3D LCD pixel array and metasurface multi-lens array, in accordance with embodiments of the present disclosure.

In another embodiment of the present disclosure, there is provided a 3D light field display module 40, which is based on a LCD technology for the pixel array and metasurface for the lens array. With reference to FIG. 22, the main components of a 3D light field display module 40 are shown. The 3D light field display module 40 includes a 3D LCD 170 and a metasurface MLA 200. The 3D LCD 50 includes a 3D LCD pixel array 54 having a plurality of 3D LCD pixels 56 electrically coupled to a TFT active matrix 150. Each 3D LCD pixel 56 includes a plurality of LCD pixels 58. In the embodiment depicted, there are 15 LCD pixels 58 in every 3D LCD pixel 56. The 15 LCD pixels are numbered 58-1 to 58-15 in the figure. The TFT active matrix is configured to turn on the individual LCD pixels 58, as described earlier. The 3D LCD 170 also includes an LCD backlight 45. The metasurface MLA 200 includes a plurality of metalenses 210 on a glass substrate 230 as described earlier.

The 3D light field display module 40 of FIG. 22 has a reduced complexity over the previous embodiments utilizing a micro-LED pixel array 140. The specifications of the 3D light field display module 40 of FIG. 22 is similar to that shown in Table 1.

Currently available LCDs have pixel pitches between 5 to 10 µm. Accordingly, the 3D light field display module 40 of FIG. 22 has a comparable performance to that of FIG. 16, which uses a 10 µm pixel array pitch. For example, the FoV 38 of the 3D light field display of FIG. 22 is 60 degrees. However, due to the limitations on the LCD pixel pitch, the 3D light field display module 40 of FIG. 22 cannot match the performance of the 3D light field display module 40 of FIG. 21, which requires a 0.1 um pixel array pitch, which is not attainable with current LCD technology.

The embodiment of FIG. 22 has similar advantages as the embodiments of FIGS. 16 and 21 in that the metasurface MLA 200 can be engineered to eliminate aberrations that are intrinsic in refractive lenses, including chromatic aberrations, spherical aberrations, coma and astigmatism. Furthermore, the focal length of the metasurface MLA 200 can be engineered to be less than 1 mm to attain an ultra-thin 3D light field display module 40 form factor.

Figure 23:
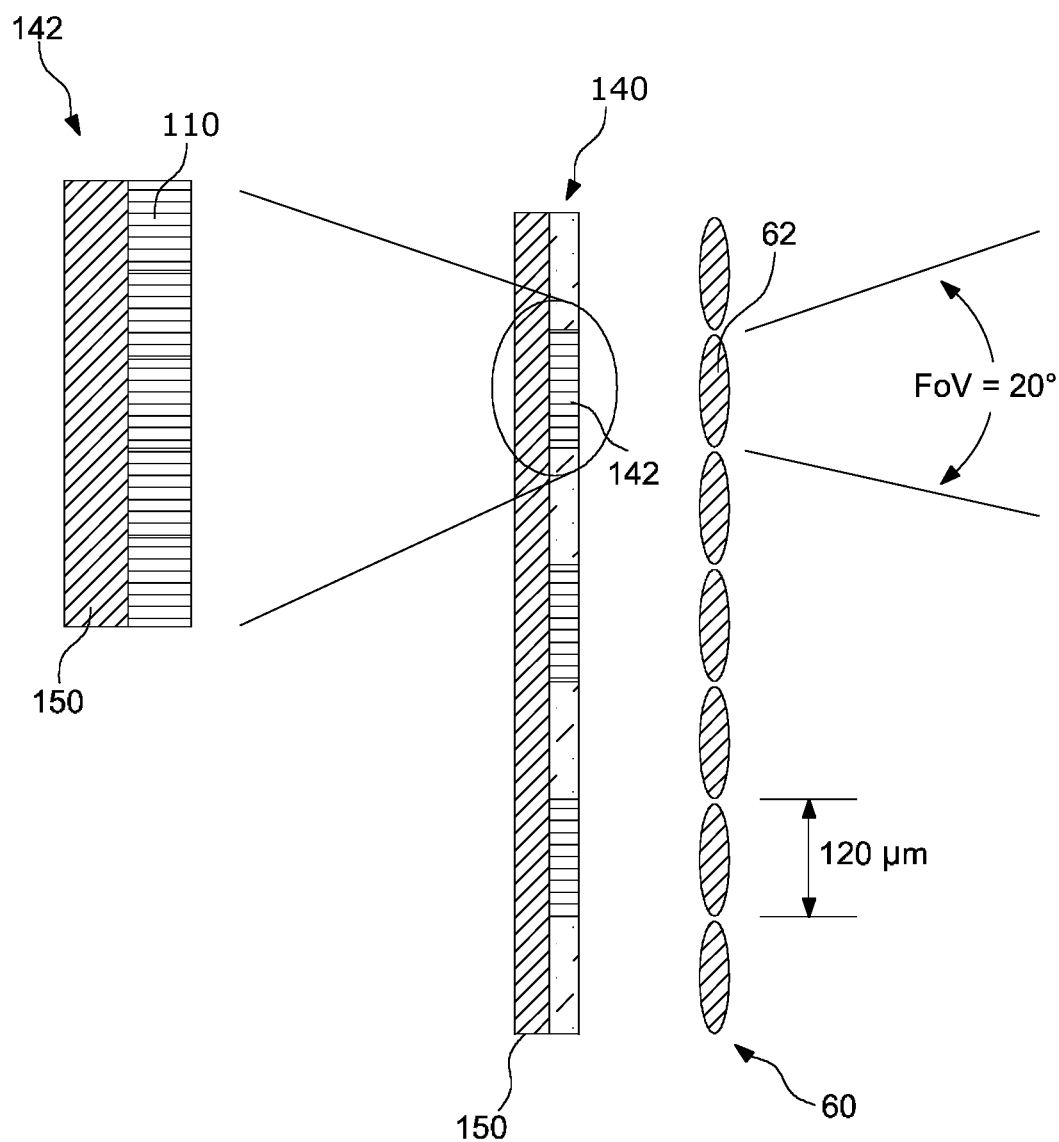
FIG. 23 is a diagram depicting the main components of a 3D light field display including a 3D micro-LED pixel array and a refractive multi-lens array, in accordance with embodiments of the present disclosure.

In yet another embodiment of the present disclosure, there is provided a 3D light field display module 40, which is based on the use of micro-LEDs for the pixel array and refractive lenses for the MLA. The advantage of using a refractive MLA 60 is that the technology is simple to implement and the complexity of the design is reduced. With reference to FIG. 23, there is provided a 3D light field display module 40 including a 3D micro-LED pixel array 140 and a refractive MLA 60. The 3D micro-LED pixel array 140 includes a plurality of 3D micro-LED pixels 142. Each 3D micro-LED pixel 142 includes a plurality of micro-LED pixels 110. A TFT active matrix 150 is electrically coupled to the 3D micro-LED pixel array and is configured for activating individual micro-LED pixels 110. The refractive MLA 60 may be a lenticular lens or something similar, and includes a plurality of refractive lenslets 62.

Due to the pitch of refractive MLAs 60 that can be down to a few microns and the very small micro-LED pixel size, which can be down to 1 µm, the spatial and angular resolutions of the 3D light field display module 40 can be quite high, as given in Table 2. However, by using refractive lenslets 62 for the refractive MLA 60, intrinsic aberrations (e.g., chromatic, spherical, coma and astigmatism) are unavoidable, which prevents focusing of light to a diffraction limited spot and reduces the attainable FoV 38. In some embodiments, the aberrations are corrected by adding lenses to provide more degrees of freedom, which results in a bulky optical system given that refractive lenslets 62 are used. In some embodiments, the shape of the refractive lens is optimized to be aspheric (free from spherical aberrations) or aplanatic (free from both spherical and coma aberrations). This, however, increases the complexity of the design and fabrication of the refractive MLA 60. Without correcting the aberrations of the refractive lenslets 62 in the refractive MLA 60, the angles of incidence over which light would be focused to a near diffraction-limited spot would be only up to a few degrees. A refractive MLA 60 has been demonstrated to provide a field of view (FoV) equal to 20°. The aberrations of the refractive MLA 60 also adversely affect how well the divergence angle of the light emitted from each 3D micro-LED pixel 142 can be controlled. As such, it is estimated that the divergence angle and thus the angular resolution of this embodiment is limited to that of the baseline case as shown in Table 1. This means that the angular resolution is 4°/view and the divergence angle is be 3°/view. Therefore, a smooth motion parallax cannot be achieved for either cases of the smartphone or TV form factors with different viewing distances. The number of views is given by the FoV 38 divided by the angular resolution, and the result would be N=5 views. In this case, only 5×5=25 pixels are required for each refractive lenslet 62 of the refractive MLA 60.

There are two example implementations of 3D light field display module 40 of FIG. 23. The first example implementation is one in which the same high definition (HD) spatial resolution is maintained, which means that the condition for the micro-LED pixel 110 size (pixel array pitch) can be relaxed. For the smartphone case, the pixel pitch would be 24 µm, and for the TV case, the pixel pitch would be 180 µm. For the second implementation, the pixel pitch is set to 5 µm, which is the size of micro-LED pixels 110 that can be mass manufactured reliably within the next 2 to 3 years. This means that the MLA pitch can be much reduced and thus a resolution beyond HD can be achieved. For both the smartphone and TV cases, the MLA pitch would be 25 µm. For the smartphone with a screen size of 6-in, the spatial resolution of the display would exceed 4K (i.e., a total of 3840× 2160=8.3 million lenslets). For the TV with screen size is 50-in, the resolution would be well beyond 16K (i.e., a total of 15360×8640=132.7 million lenslets).

TABLE 3

Specifications for the light field display of FIG. 32 as a smartphone display

| Parameter | Target specification |
|---|---|
| Pixel array pitch | Smartphone: 24 µm |
| | TV: 180 µm |
| MLA pitch | Smartphone: |
| | 120 µm (5 × 5 pixels each lenslet) |
| | TV: |
| | 900 µm (5 × 5 pixels each lenslet) |
| Angular resolution | 4°/view (smartphone and TV) |
| Field of view (FoV) | 20° |
| | 5 views in each direction |
| | (smartphone and TV) |
| Divergence angle of light of each view (FWHM) | 3° (smartphone and TV) |

TABLE 4

Specifications for 3D light field display for 4K TVs

| Parameter | Target specification |
|---|---|
| Pixel array pitch | 5 µm |
| MLA pitch | Smartphone and TV: |
| | 25 µm (5 × 5 pixels each lenslet) |
| Angular resolution | 4°/view (smartphone and TV) |
| Field of view (FoV) | 20° |
| | 5 views in each direction |
| | (smartphone and TV) |
| Divergence angle of light of each view (FWHM) | 3° (smartphone and TV) |

Tables 3 and 4 show the target specifications of embodiments of the 3D light field display module suitable for the HD and beyond 4K display implementations, respectively.

Using the embodiment of FIG. 23, the HD and beyond 4K implementations of the 3D light field display module 40 with the specifications as shown in Table 3 and Table 4 can be achieved. By using micro-LEDs for the pixel array, several problems of the prior art are solved. First, micro-LED pixels 110 are self-emissive, and thus a backlight is not required for the 3D micro-LED pixel array 140, which is much simpler than using both the backlight and SLM as in the prior art LCDs. In addition, by using nanowire 80 micro-LEDs, the contrast ratio can in fact be infinity in comparison to the limited contrast ratio of LCDs. The pixel size by implementation with micro-LEDs can also be scaled down to 1 μm. In fact, it only needs to be down to 24 μm and 180 μm, respectively, for the smartphone and TV cases to attain HD resolution. With the pixel size scaled down to 5 μm, the beyond 4K implementation of this embodiment can be achieved.

While the various figures have shown a 3D light field display module, with only the pixel array and MLA components showing, it would be understood by those of skill in the art that a 3D light field display would contain other components. For example, in addition to the 3D light field display module described, a 3D light field display may contain other components such as graphics processors, memory, power supplies and the like. The other components would be operatively coupled (e.g., electrically coupled) to the depicted components. The other components have been omitted from the figures to emphasize the main features of the embodiments.

While various components have been shown to have planar structures, it would be understood by those of skill in the art that the described technology is also applicable to curved structures. For example, pixel arrays and MLAs may have curved structures.

In this disclosure, the term "parallel" includes being strictly parallel and substantially parallel relationships. Both planar and curved structures may be parallel as they maintain substantially uniform equal distances therebetween.

In this disclosure, the term "planar" describes structures which are strictly planar and substantially planar.

In this disclosure, when two structures are "aligned", this includes being "strictly aligned" and substantially aligned with one another.

Certain adaptations and modifications of the described embodiments can be made. Therefore, the above-discussed embodiments are considered illustrative and not restrictive.

The invention claimed is:

1. A three-dimensional (3D) light field display module, comprising:
a 3D pixel array comprising a plurality of 3D pixels, each 3D pixel of the plurality of 3D pixels comprising a plurality of pixels;
a metasurface multi-lens array (MLA) having a plurality of metalenses arranged on a substrate, the metasurface MLA being positioned parallel to the 3D pixel array, spaced therefrom and arranged such that each metalens of the plurality of metalenses is opposite and aligned with a corresponding 3D pixel of the plurality of 3D pixels, and the each metalens covers a number of the pixels of the corresponding 3D pixel, the each metalens used for directing incident light rays emitted by the 3D pixel to different views; and
an active matrix electrically coupled to the 3D pixel array for activating the plurality of pixels.

2. The 3D light field display module of claim 1, wherein the 3D pixel array comprises a 3D liquid crystal display (LCD) pixel array, and the 3D light field display module further comprises a backlight and a spatial light modulator (SLM).

3. The 3D light field display module of claim 2, wherein the 3D LCD pixel array comprises a plurality of 3D LCD pixels, and each 3D LCD pixel of the plurality of 3D LCD pixels comprises a plurality of LCD pixels.

4. The 3D light field display module of claim 1, wherein the 3D pixel array comprises a 3D micro-LED pixel array.

5. The 3D light field display module of claim 4, wherein the 3D micro-LED pixel array comprises a plurality of 3D micro-LED pixels; and each 3D micro-LED pixel of the plurality of 3D micro-LED pixels comprises a plurality of micro-LED pixels.

6. The 3D light field display module of claim 5, wherein the micro-LED pixels have a pitch of 10 μm and the metasurface MLA has a pitch of 150 μm.

7. The 3D light field display module of claim 5, wherein the micro-LED pixels have a pitch of 0.95 μm and the metasurface MLA has a pitch of 120 μm.

8. The 3D light field display module of claim 5, wherein the micro-LED pixels each has a divergence angle, and each of the 3D micro-LED pixels has an angular resolution larger than the divergence angle for reducing cross-talk between adjacent micro-LED pixels.

9. The 3D light field display module of claim 8 having a field of view which is based on the angular resolution.

10. The 3D light field display module of claim 5, wherein the micro-LED pixels each comprises a plurality of nanowires arranged on a substrate.

11. The 3D light field display module of claim 10, wherein the nanowires are III-nitride nanowires or AlGaN nanowires, and the substrate comprises a $TiO_2$ substrate.

12. The 3D light field display module of claim 10, wherein the nanowires have different diameters for emitting different colors.

13. The 3D light field display module of claim 12, wherein the plurality of nanowires comprises three nanowires each emitting a primary color.

14. The 3D light field display module of claim 1, wherein the metasurface MLA is spaced from the 3D pixel array such that it is located at a focal length of the metalenses.

15. The 3D light field display module of claim 1, further comprising a plurality of baffles located between adjacent 3D pixels of the plurality of 3D pixels, the baffles arranged for preventing incident rays from an edge pixel of a first 3D pixel crossing into a second adjacent 3D pixel.

16. The 3D light field display module of claim 1, further comprising a refractive MLA including a plurality of refractive lenslets, the refractive MLA disposed between the 3D pixel array and the metasurface MLA, wherein: the plurality of refractive lenslets are aligned with the 3D pixels for collimating the incident light rays therefrom.

17. The 3D light field display module of claim 1, wherein the metalenses comprise a plurality of nanofins oriented a different angles disposed on a substrate.

18. The 3D light field display module of claim 17, wherein the plurality of nanofins comprise $TiO_2$ nanofins, and the substrate comprises a glass ($SiO_2$) substrate.

19. The 3D light field display module of claim 1, wherein the metalenses each comprises a first plurality of nanofins disposed on one side of a substrate and a second plurality of nanofins disposed on an opposite side of the substrate.

20. The 3D light field display module of claim 1, wherein the active matrix comprises a vertically stacked thin film transistor (VST) active matrix.

\* \* \* \* \*